United States Patent
Baba et al.

(10) Patent No.: US 9,128,707 B2
(45) Date of Patent: Sep. 8, 2015

(54) POWER-SUPPLY CONTROL DEVICE FOR SHIFTING THE OPERATING STATE OF A MULTI-FUNCTIONAL PRINTER DEPENDING ON THE DETECTION OF A BODY IN A PREDETERMINED REGION

(75) Inventors: Motofumi Baba, Kanagawa (JP);
Kazuhiko Narushima, Kanagawa (JP);
Kenta Ogata, Kanagawa (JP);
Masafumi Ono, kanagawa (JP);
Mitsunobu Mamiya, Kanagawa (JP);
Kenji Kuroishi, Kanagawa (JP);
Kouichi Azuma, Kanagawa (JP);
Hidenori Horie, Kanagawa (JP);
Masato Ishiyama, Kanagawa (JP);
Keiko Shiraishi, Kanagawa (JP); Ryo Ando, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 746 days.

(21) Appl. No.: 13/234,360

(22) Filed: Sep. 16, 2011

(65) Prior Publication Data
US 2012/0204046 A1 Aug. 9, 2012

(30) Foreign Application Priority Data
Feb. 9, 2011 (JP) .................. 2011-026590

(51) Int. Cl.
*G06F 1/00* (2006.01)
*G06F 1/32* (2006.01)
*G03G 15/00* (2006.01)

(52) U.S. Cl.
CPC .......... *G06F 1/3203* (2013.01); *G03G 15/5004* (2013.01); *G06F 1/3231* (2013.01); *Y02B 60/1289* (2013.01)

(58) Field of Classification Search
CPC .................................. G06F 1/3203
USPC ....................................... 713/300
See application file for complete search history.

(56) References Cited

U.S. PATENT DOCUMENTS 5,822,077 A 10/1998 Sasaki et al.
2004/0073827 A1* 4/2004 Tsirkel et al. ................. 713/323
(Continued)

FOREIGN PATENT DOCUMENTS

JP 06-242258 A 9/1994
JP 10-105291 A 4/1998
(Continued)

OTHER PUBLICATIONS

Japanese Office Action issued Sep. 4, 2012 in corresponding Japanese Patent Application No. 2011-026590.
(Continued)

*Primary Examiner* — Thomas Lee
*Assistant Examiner* — Robert Cassity
(74) *Attorney, Agent, or Firm* — Sughrue Mion, PLLC

(57) ABSTRACT

A power-supply control device includes a power-supply-state transition control section, body-capable-of-movement detection sections, and an instruction section. The power-supply-state transition control section shifts a state of an operation target section from one state to another state among power-supply states and a non-power-supply state. The body-capable-of-movement detection sections detect a body capable of movement in a region. The instruction section provides, on the basis of results of detection of the body capable of movement by the body-capable-of-movement detection sections, at least an instruction for shifting between one of the power-supply states and the non-power-supply state, among instructions for shifting the state of the operation target section from one state to another state with the power-supply-state transition control section.

20 Claims, 25 Drawing Sheets

(56) References Cited

U.S. PATENT DOCUMENTS

| | | | |
|---|---|---|---|
| 2006/0050263 A1* | 3/2006 | Mizuo et al. | 356/5.01 |
| 2009/0316178 A1* | 12/2009 | Tanaka | 358/1.14 |
| 2010/0150600 A1* | 6/2010 | Oyoshi | 399/88 |
| 2010/0250985 A1* | 9/2010 | Gupta | 713/323 |
| 2011/0296163 A1* | 12/2011 | Abernethy et al. | 713/100 |

FOREIGN PATENT DOCUMENTS

| | | | |
|---|---|---|---|
| JP | 2001042849 A | 2/2001 | |
| JP | 2010072716 A | 4/2010 | |
| WO | 2010/095075 A1 | 8/2010 | |

OTHER PUBLICATIONS

Japanese Office Action issued Mar. 12, 2013 in corresponding Japanese Patent Application No. 2012-180526.

Communication from Japanese Patent Office dated Jun. 19, 2012 in corresponding Japanese Application No. 2011-026590.

Communication dated May 14, 2015 from the State Intellectual Property Office of the People's Republic of China in counterpart application No. 201110406868.8.

\* cited by examiner

POWER-SUPPLY CONTROL DEVICE FOR SHIFTING THE OPERATING STATE OF A MULTI-FUNCTIONAL PRINTER DEPENDING ON THE DETECTION OF A BODY IN A PREDETERMINED REGION

CROSS-REFERENCE TO RELATED APPLICATIONS

This application is based on and claims priority under 35 USC 119 from Japanese Patent Application No. 2011-026590 filed Feb. 9, 2011.

BACKGROUND (i) Technical Field

The present invention relates to a power-supply control device, an image processing apparatus, a power-supply control method, and a computer readable medium storing a program.

SUMMARY

According to an aspect of the invention, there is provided a power-supply control device including a power-supply-state transition control section, multiple body-capable-of-movement detection sections, and an instruction section. The power-supply-state transition control section shifts a state of an operation target section from one state to another state among multiple power-supply states and a non-power-supply state. The operation target section is a section which operates by receiving supply of power from a mains power source section. Each of the multiple power-supply states is a state having a power consumption which is a corresponding one of power consumptions that are different from one another. The non-power-supply state is a state in which supply of power is not received from the mains power source section or a state in which supply of power that is lower than power determined in advance and that is necessary for control of determining whether or not power is to be supplied is received from the mains power source section. The multiple body-capable-of-movement detection sections detect a body capable of movement in a region which is set in advance. Each of the multiple body-capable-of-movement detection sections has a corresponding one of detection conditions different from one another. The body capable of movement includes a user who intends to use the operation target section. The instruction section provides, on the basis of results of detection of the body capable of movement by the multiple body-capable-of-movement detection sections, at least an instruction for shifting between one of the multiple power-supply states and the non-power-supply state, among instructions for shifting the state of the operation target section from one state to another state with the power-supply-state transition control section.

BRIEF DESCRIPTION OF THE DRAWINGS

Exemplary embodiment(s) of the present invention will be described in detail based on the following figures, wherein.

DETAILED DESCRIPTION

Figure 1:
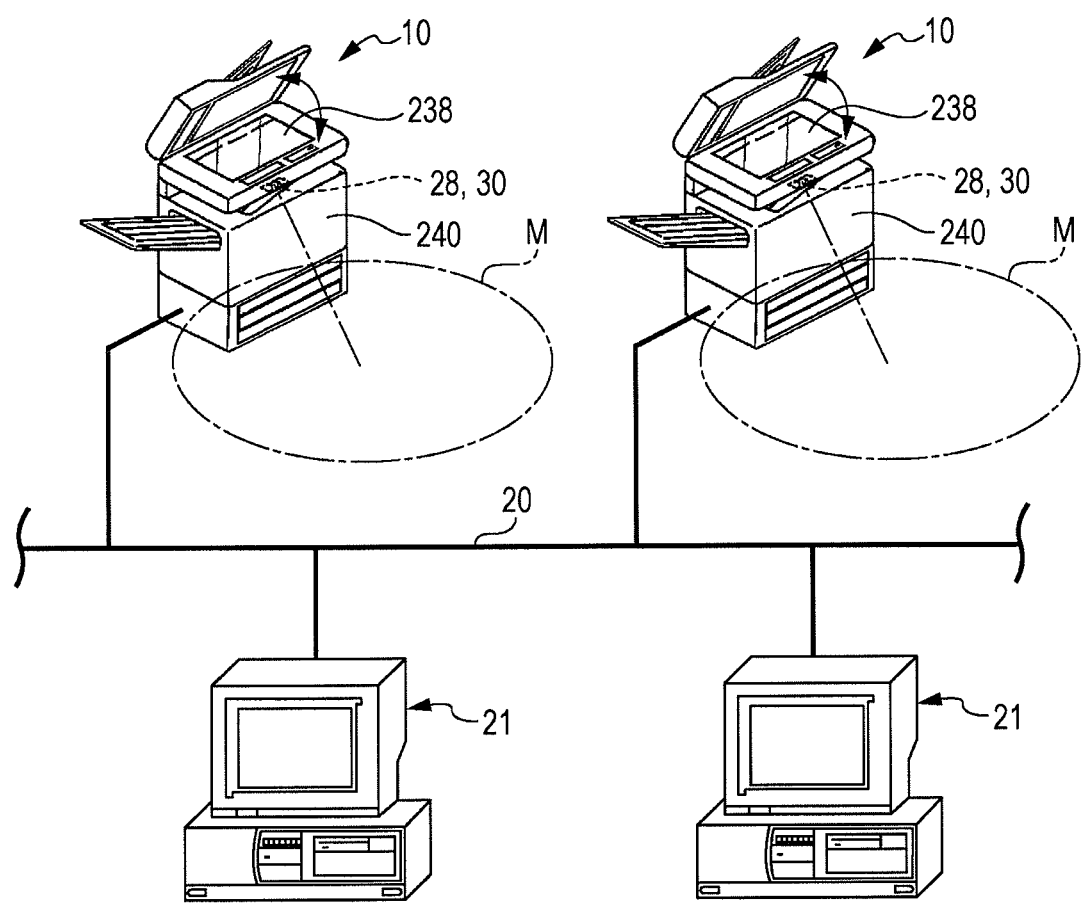
FIG. 1 is a communication-network connection diagram in which an image processing apparatus according to a present exemplary embodiment is included.

As illustrated in FIG. 1, an image processing apparatus 10 according to a present exemplary embodiment is connected to a network-communication network 20 such as the Internet. In FIG. 1, two image processing apparatuses 10 are connected. However, the number of image processing apparatuses 10 that are connected is not limited, and may be one or be three or more.

Furthermore, multiple personal computers (PCs) 21 that serve as information terminal apparatuses are connected to the network-communication network 20. In FIG. 1, two PCs 21 are connected. However, the number of PCs 21 that are connected is not limited, and may be one or be three or more. Moreover, the information terminal apparatuses are not limited to the PCs 21. Additionally, wired connection does not necessarily need to be used for the network-communication network 20. In other words, the network-communication network 20 may be a communication network in which information is transmitted and received using wireless connection.

As illustrated in FIG. 1, regarding each of the image processing apparatuses 10, there is a case in which, for example, a remote operation of transferring data and of providing an instruction for performing image formation (printing) is performed using one of the PCs 21 on the image processing apparatus 10. Alternatively, there is a case in which a user stands up in front of the image processing apparatus 10, and in which the user provides, by performing various types of operations on the image processing apparatus 10, an instruction for performing a process, such as a copy process, a scan process (an image read process), or a facsimile transmission/reception process.

Figure 2:
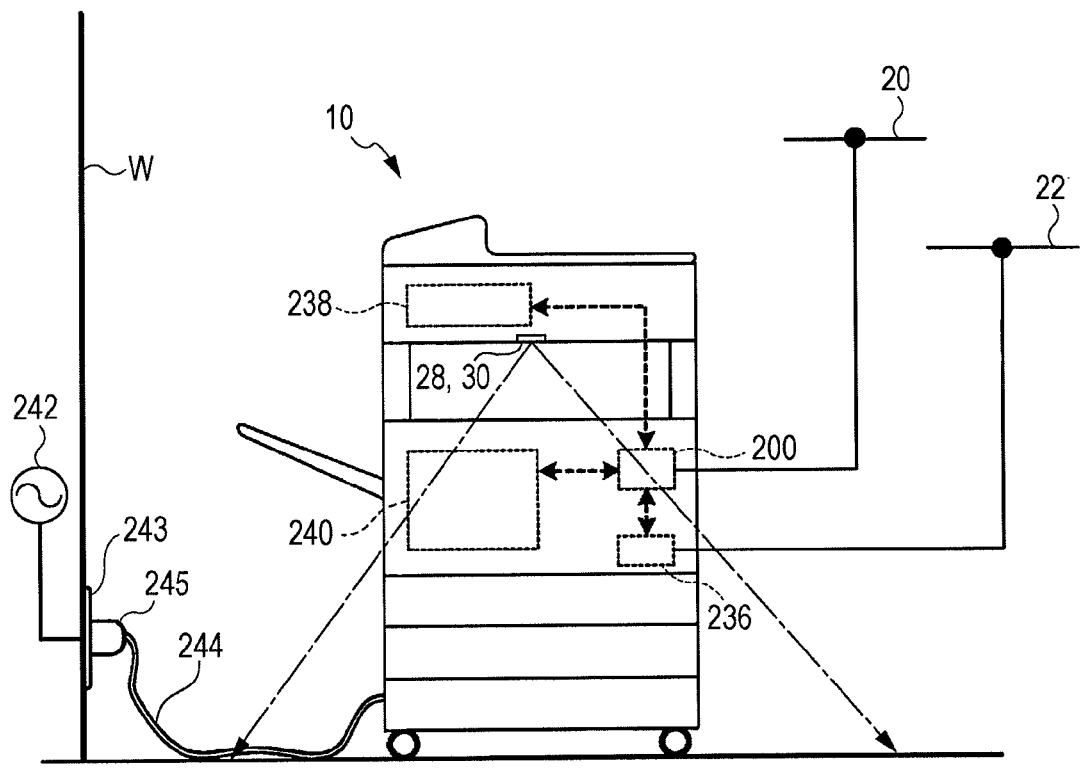
FIG. 2 is a schematic diagram of the image processing apparatus according to the present exemplary embodiment.

FIG. 2 illustrates the image processing apparatus 10 according to the present exemplary embodiment. The image processing apparatus 10 includes an image forming section 240 that forms an image on a recording sheet, an image reading section 238 that reads a document image, and a facsimile-communication control circuit 236. The image processing apparatus 10 includes a main controller 200. The main controller 200 controls the image forming section 240, the image reading section 238, and the facsimile-communication control circuit 236, thereby temporarily storing image data regarding a document image read by the image reading section 238 or transmitting the read image data to the image forming section 240 or to the facsimile-communication control circuit 236.

The network-communication network 20 such as the Internet is connected to the main controller 200. A telephone network 22 is connected to the facsimile-communication control circuit 236. The main controller 200 is connected to, for example, a host computer via the network-communication network 20. The main controller 200 has a function of receiving image data and a function of performing facsimile reception and facsimile transmission using the telephone network 22 via the facsimile-communication control circuit 236.

In the image reading section 238, a document plate, a scanning drive system, and photoelectric conversion elements are provided. On the document plate, positioning of a document is performed. The scanning drive system scans an image formed on the document that is placed on the document plate, thereby irradiating the image with light. The photoelectric conversion elements, such as CCDs, receive reflected light or transmitted light, which are obtained by scanning the image with the scanning drive system, and convert the reflected light or transmitted light into electric signals.

The image forming section 240 includes a photoconductor drum. Around the photoconductor drum, a charging device, a scanning exposure unit, an image development unit, a transfer unit, and a cleaning unit are provided. The charging device uniformly charges the photoconductor drum. The scanning exposure unit scans the photoconductor using a light beam on the basis of image data. The image development unit develops an electrostatic latent image that has been formed by scanning the photoconductor drum with the scanning exposure unit so as to expose the photoconductor drum to the light beam. The transfer unit transfers, onto a recording sheet, an image that has been visualized on the photoconductor drum. The cleaning unit cleans the surface of the photoconductor drum after transfer is performed by the transfer unit. Furthermore, a fixing unit that fixes the image which has been transferred onto the recoding sheet is provided along a path along which the recording sheet is transported.

Regarding the image processing apparatus 10, a plug 245 is attached to an end of an input power line 244. The plug 245 is inserted in a plug plate 243 of a mains power source 242 for which installation of wires to a wall surface W is performed, whereby the image processing apparatus 10 receives supply of power from the mains power source 242.

Hardware Configuration of Control System

Figure 3:
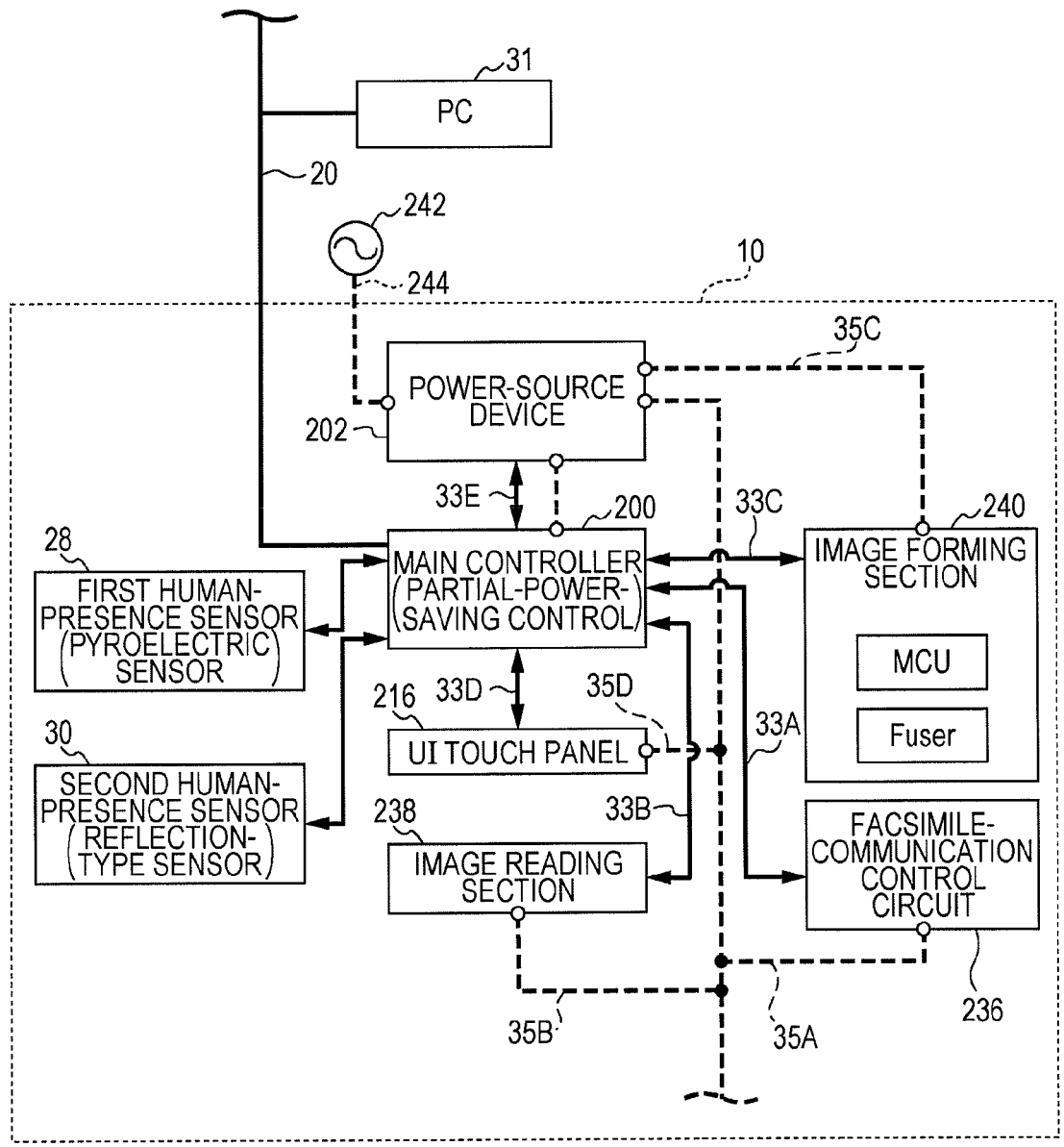
FIG. 3 is a block diagram illustrating a configuration of a control system of the image processing apparatus according to the present exemplary embodiment.

FIG. 3 is a schematic diagram of a hardware configuration of a control system of the image processing apparatus 10.

The network-communication network 20 is connected to the main controller 200. The facsimile-communication control circuit 236, the image reading section 238, the image forming section 240, and a user interface (UI) touch panel 216 are connected to the main controller 200 via buses 33A to 33D, respectively, such as data buses and control buses. In other words, the main controller 200 controls the individual processing sections of the image processing apparatus 10.

Furthermore, the image processing apparatus 10 includes a power-source device 202, and the power-source device 202 is connected to the main controller 200 via a bus 33E. The power-source device 202 receives supply of power from the mains power source 242. The power-source device 202 is provided with power supply lines 35A to 35D that are used independently of one another so that power is supplied, through each of the power supply lines 35A to 35D, to a corresponding one of the main controller 200, the facsimile-communication control circuit 236, the image reading section 238, the image forming section 240, and the UI touch panel 216. Accordingly, power is supplied to the individual processing sections (devices) on a processing-section-by-processing-section basis (in a mode state that is a power-supply state), or supply of power to the individual processing sections is interrupted on a processing-section-by-processing-section basis (in a sleep mode), whereby so called partial-power-saving control can be realized by the main controller 200.

Moreover, two human-presence sensors, i.e., a first human-presence sensor 28 and a second human-presence sensor 30, are connected to the main controller 200, and monitor existence/non-existence of a person in the periphery of the image processing apparatus 10. The first human-presence sensor 28 and the second human-presence sensor 30 will be described below.

Functional Block Diagram of Configuration for Partial Power Saving

Figure 4:
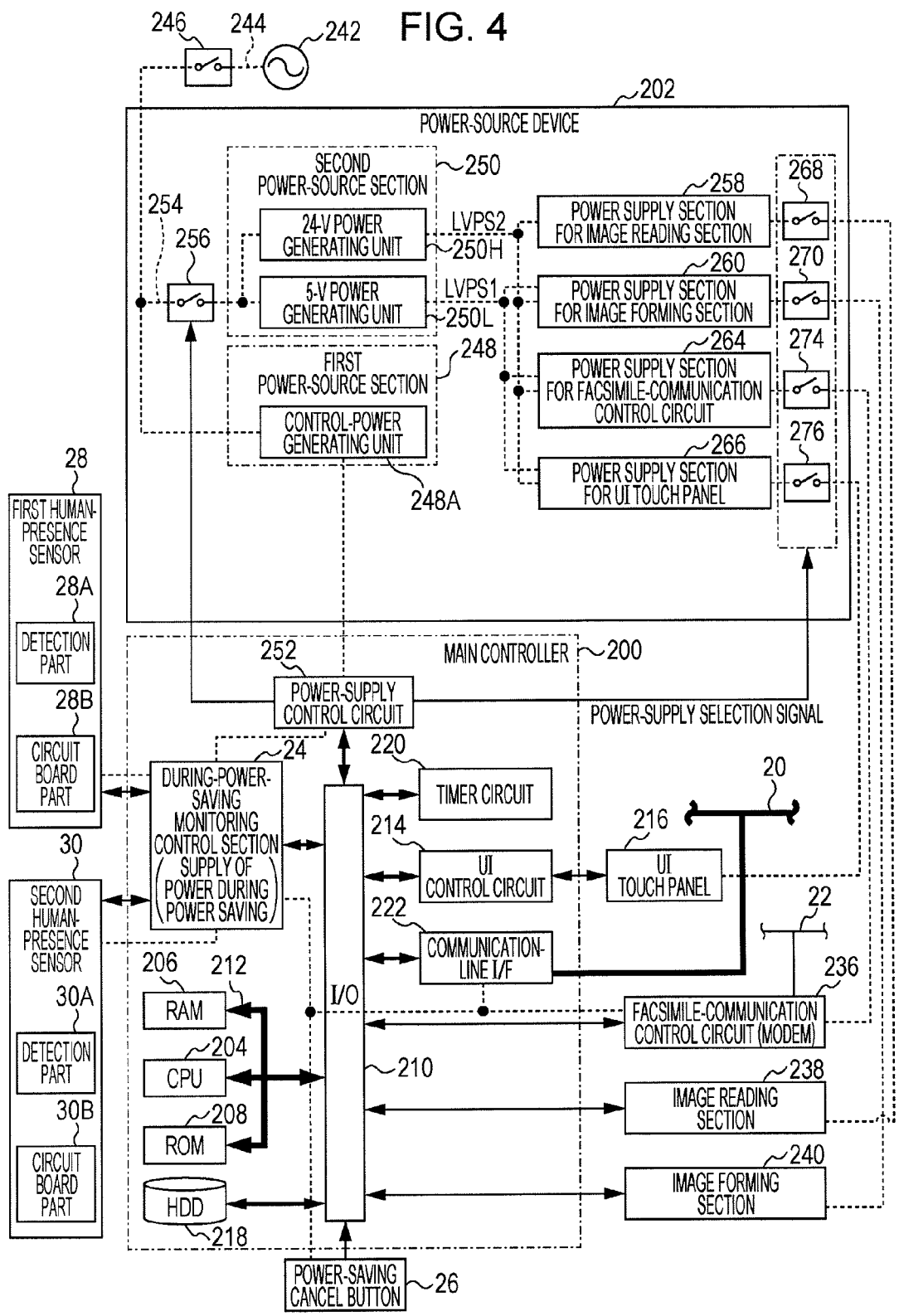
FIG. 4 is a schematic diagram illustrating a main controller and a control system of a power-source device on a function-by-function basis in the present exemplary embodiment.

FIG. 4 is a schematic diagram of a configuration in which the processing sections (which are referred to as "devices", "modules", or the like in some cases) that are controlled by the main controller 200, the main controller 200, and power lines, through which power is supplied to the individual devices, of the power-source device 202, and so forth are provided. In the present exemplary embodiment, supply or non-supply of power can be realized on a processing-section-by-processing-section basis in the image processing apparatus 10 (partial power saving).

Main Controller 200

As illustrated in FIG. 4, the main controller 200 includes a central processing unit (CPU) 204, a random-access memory (RAM) 206, a read-only memory (ROM) 208, an input/output (I/O) (input/output section) 210, and a bus 212 including a data bus, a control bus, and so forth that are used to connect the CPU 204, the RAM 206, the ROM 208, the I/O 210 to each other. A user interface (UI) touch panel 216 is connected to the I/O 210 via a UI control circuit 214. Furthermore, a hard disk (HDD) 218 is connected to the I/O 210. The CPU 204 operates in accordance with a program recorded in the ROM 208, the hard disk 218, or the like, thereby realizing functions of the main controller 200. Note that the program may be installed from a recording medium (a compact disc read-only memory (CD-ROM), a digital versatile disk read-only memory (DVD-ROM), or the like) on which the program is stored, and the CPU 204 may operate in accordance with the program, whereby image processing functions may be realized.

A timer circuit 220 and a communication-line interface (I/F) 222 are connected to the I/O 210. Furthermore, the individual devices, which are the facsimile-communication control circuit (a modem) 236, the image reading section 238, and the image forming section 240, are connected to the I/O 210.

Note that, the timer circuit 220 measures an initial timer setting time in order to provide an opportunity for setting the facsimile-communication control circuit 236, the image reading section 238, and the image forming section 240 to be in a power-saving state (a non-power-supply state). The timer circuit 220 includes timers. Hereinafter, one of the timers included in the timer circuit 220 is referred to as a "timer".

Power is supplied from the power-source device 202 to the main controller 200 and the individual devices (the facsimile-communication control circuit 236, the image reading section 238, and the image forming section 240) (see dotted lines illustrated in FIG. 4). Note that, although one line (a dotted line) is illustrated as a power line in FIG. 4, the power line includes a few wiring lines in reality.

Power-Source Device 202

As illustrated in FIG. 4, the input power line 244, which is routed from the mains power source 242, is connected to a main switch 246. The main switch 246 is turned on, whereby supply of power to a first power-source section 248 and a second power-source section 250 becomes enabled.

The first power-source section 248 includes a control-power generating unit 248A. The control-power generating unit 248A is connected to a power-supply control circuit 252 of the main controller 200. The power-supply control circuit 252 supplies power to the main controller 200, and is connected to the I/O 210. The power-supply control circuit 252 performs, in accordance with a control program executed by the main controller 200, switching control for causing electricity to be conducted/not conducted through power-supply lines through which power is supplied to the individual devices (the facsimile-communication control circuit 236, the image reading section 238, and the image forming section 240).

In contrast, regarding a power line 254 that is to be connected to the second power-source section 250, a first sub-power-source switch 256 (hereinafter, referred to as a "SW-1" in some cases) is intervened between the power line 254 and the second power-source section 250. The SW-1 is controlled by the power-supply control circuit 252 so as to be turned on/off.

Furthermore, the second power-source section 250 includes a 24-V power generating unit 250H (LVPS2) and a 5-V power generating unit 250L (LVPS1). The 24-V power generating unit 250H (LVPS2) is a power source that is used, for example, for a motor.

The 24-V power generating unit 250H (LVPS2) and the 5-V power generating unit 250L (LVPS1) of the second power-source section 250 are selectively connected to a power supply section 258 for the image reading section 238, a power supply section 260 for the image forming section 240, a power supply section 264 for the facsimile-communication control circuit 236, and a power supply section 266 for the UI touch panel 216.

The power supply section 258 for the image reading section 238 uses the 24-V power generating unit 250H (LVPS2) as an input source, and is connected to the image reading section 238 via a second sub-power-source switch 268 (hereinafter, referred to as a "SW-2" in some cases).

The power supply section 260 for the image forming section 240 uses the 24-V power generating unit 250H (LVPS2) and the 5-V power generating unit 250L (LVPS1) as input sources, and is connected to the image forming section 240 via a third sub-power-source switch 270 (hereinafter, referred to as a "SW-3" in some cases).

The power supply section 264 for the facsimile-communication control circuit 236 uses the 24-V power generating unit 250H (LVPS2) and the 5-V power generating unit 250L (LVPS1) as input sources, and is connected to the facsimile-communication control circuit 236 via a fifth sub-power-source switch 274 (hereinafter, referred to as a "SW-5" in some cases).

The power supply section 266 for the UI touch panel 216 uses the 5-V power generating unit 250L (LVPS1) and the 24-V power generating unit 250H (LVPS2) as input sources, and is connected to the UI touch panel 216 via a sixth sub-power-source switch 276 (hereinafter, referred to as a "SW-6" in some cases).

As in the case of the first sub-power-source switch 256, each of the second sub-power-source switch 268, the third sub-power-source switch 270, the fifth sub-power-source switch 274, and the sixth sub-power-source switch 276 is controlled, in accordance with a power-supply selection signal supplied from the power-supply control circuit 252 of the main controller 200, so as to be turned on/off. Switches and wiring lines that are used to supply power from the 24-V power generating unit 250H and the 5-V power generating unit 250L are configured so as to form two channels, although they are not illustrated. Furthermore, the second sub-power-source switch 268, the third sub-power-source switch 270, the fifth sub-power-source switch 274, and the sixth sub-power-source switch 276 may be disposed in the individual devices to which power is to be supplied, instead of being disposed in the power-source device 202.

In the above-described configuration, the power sources connected so as to select the individual devices (the facsimile-communication control circuit 236, the image reading section 238, and the image forming section 240) on a function-by-function basis are provided, and power is not supplied to devices that are not necessary for a specified function. Accordingly, minimum necessary power is only necessary.

Monitoring Control

Here, regarding the main controller 200 in the present exemplary embodiment, in some cases, the functions thereof are partially stopped in order to consume minimum necessary power. Alternatively, in some cases, supply of power to elements including most sections of the main controller 200 is stopped. Such cases are collectively referred to a "sleep mode (a power saving mode)".

For example, a timer is activated at a point in time when image processing finishes, whereby the operation state of the image processing apparatus 10 can be shifted to the sleep mode. In other words, as a result of measuring a predetermined time with the timer since the timer has been activated, supply of power is stopped. Note that, if a certain operation (an operation using hard keys or the like) is performed before the predetermined time elapses, as a matter of course, measurement of the predetermined time with the timer, which is performed in order to use for shifting to the sleep mode, is stopped, and the timer is activated at a point in time when the next image processing finishes.

In contrast, a during-power-saving monitoring control section 24 is provided as an element that always receives supply of power during the sleep mode, and is connected to the I/O 210. The during-power-saving monitoring control section 24 may be configured using, for example, an integrated circuit (IC) chip, which is referred to as an "application-specific integrated circuit (ASIC)", in which an operation program is stored, and which includes a CPU, a RAM, a ROM, and so forth that are processed in accordance with the operation program.

When monitoring during the power saving mode is performed, it is supposed that, for example, a print request is received from a communication-line detector or a facsimile (FAX) reception request is received from a FAX line detector, and, in accordance with the request, the during-power-saving monitoring control section 24 controls the first sub-power-source switch 256, the second sub-power-source switch 268, the third sub-power-source switch 270, the fifth sub-power-source switch 274, and the sixth sub-power-source switch 276, thereby supplying power to devices that have been set in the power saving mode.

Furthermore, a power-saving cancel button 26 is connected to the I/O 210 of the main controller 200. A user performs an operation on the power-saving cancel button 26 during the power saving mode, whereby the power saving mode can be cancelled.

Here, in order to perform monitoring in the sleep mode, minimum necessary power may be supplied to the power-saving cancel button 26 and the individual detectors in addition to the during-power-saving monitoring control section 24. In other words, supply of power that is equal to or lower than a value determined in advance (for example, equal to or lower than 0.5 W) and that is necessary for control of determining whether or not power is to be supplied may be received even in the sleep mode that is a non-power-supply state.

Figure 5:
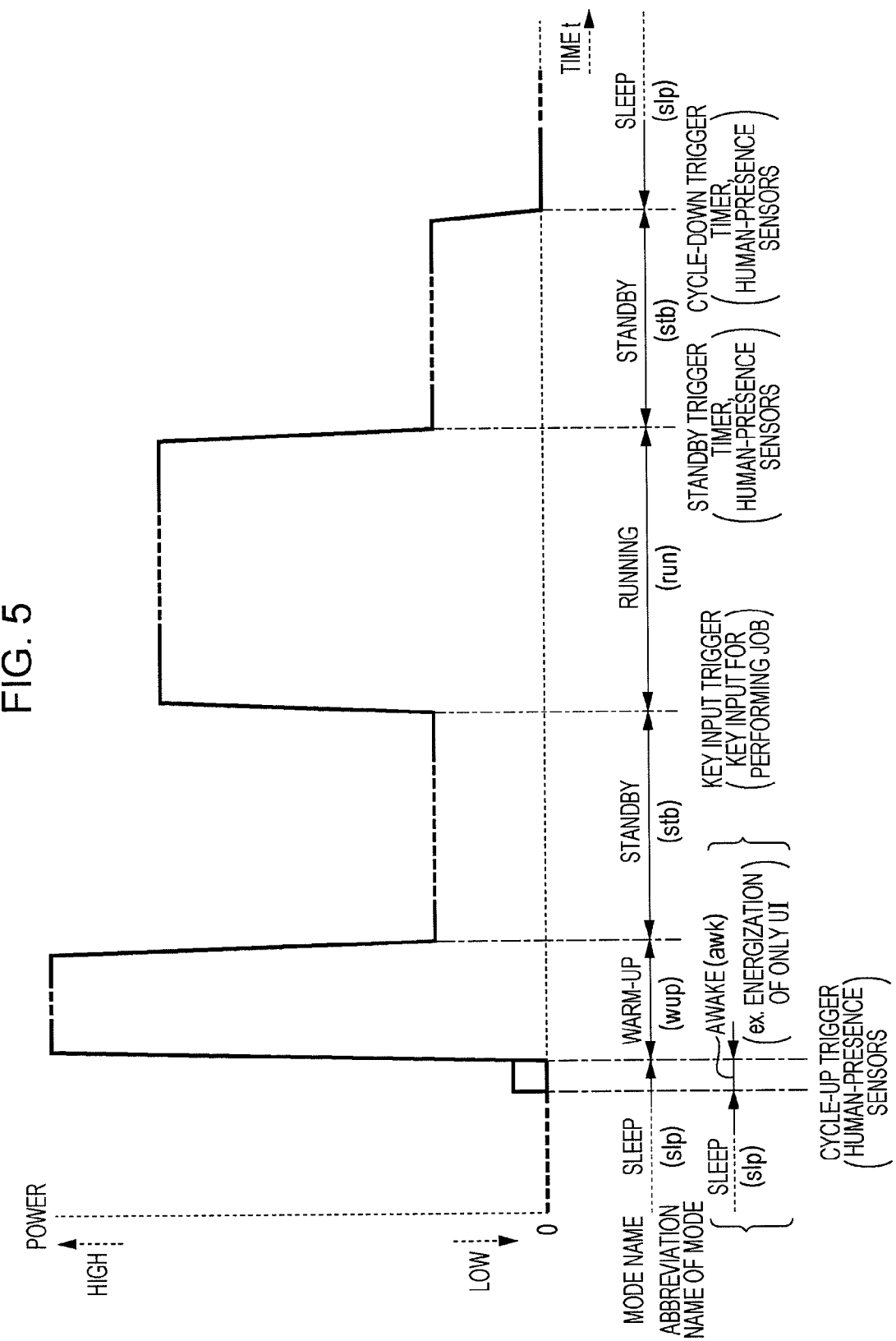
FIG. 5 is a timing chart illustrating individual mode states of the image processing apparatus and events that provide opportunities for shifting from one mode state to another mode state among the mode states.

Note that, in a specific time period (an awake mode (awk) illustrated in FIG. 5) of the sleep mode, minimum necessary power that is, for example, necessary for input systems including the UI touch panel 216 is supplied.

In the sleep mode, when a user stands up in front of the image processing apparatus 10, and, then, performs an operation on the power-saving cancel button 26 to resume supply of power, there are some cases in which it takes time until the image processing apparatus 10 becomes activated.

For this reason, in the present exemplary embodiment, the first human-presence sensor 28 and the second human-presence sensor 30 are provided in the during-power-saving monitoring control section 24. Additionally, in the sleep mode, the first human-presence sensor 28 and the second human-presence sensor 30 detect a user before the user presses the power-saving cancel button 26, and supply of power is early resumed, so that the user can quickly use the image processing apparatus 10. Note that, although the power-saving cancel button 26, the first human-presence sensor 28, and the second human-presence sensor 30 are used in combination, everything may be monitored only by the first human-presence sensor 28 and the second human-presence sensor 30.

The first human-presence sensor 28 and the second human-presence sensor 30 include detection parts 28A and 30A and circuit board parts 28B and 30B, respectively. The circuit board parts 28B and 30B adjust the sensitivities of signals that have been detected by the detection parts 28A and 30A, respectively, and generate output signals.

Note that, regarding the first human-presence sensor 28, the term "human presence" is used. However, the term "human presence sensor" is a proper noun used in accordance with the present exemplary embodiment. The human-presence sensor at least needs to detect a person. In other words, the human-presence sensor may also detect a body capable of movement other than a person. Accordingly, in the description give below, there are some cases in which a target to be detected by the human-presence sensor is a "person". However, in the future, a robot or the like that performs an operation instead of a person may be included in examples of a target to be detected by the human-presence sensor. Note that, in contrast, when a specific sensor capable of exclusively detecting a person exists, the specific sensor may be applied.

The specification of the first human-presence sensor 28 includes detection of movement of a person in the periphery of the image processing apparatus 10. In this case, the first human-presence sensor 28 is typified by, for example, an infrared ray sensor using a pyroelectric effect of a pyroelectric element (a pyroelectric sensor). In the present exemplary embodiment, a pyroelectric sensor is applied as the first human-presence sensor 28.

The most distinctive feature of the pyroelectric sensor that is applied as the first human-presence sensor 28 and that uses a pyroelectric effect of a pyroelectric element is that the detection region thereof is large. Furthermore, because the sensor detects movement of a person, when a person is standing still in the detection region, the sensor does not detect the existence of the person. For example, supposing that a high-level signal is output when a person moves, when the person becomes still in the detection region, the signal changes from the high-level signal to a low-level signal.

In contrast, regarding the specification of the second human-presence sensor 30, a sensor that detects presence/absence (existence/non-existence) of a person is applied. The sensor that is applied as the second human-presence sensor 30 is typified by, for example, a reflection-type sensor including a light-projecting unit and a light-receiving unit (a reflection-type sensor). Note that a configuration in which the light-projecting unit and the light-receiving unit are separated from each other may be used.

The most distinctive feature of the reflection-type sensor that is applied as the second human-presence sensor 30 is that the reflection-type sensor reliably detects presence/absence of a person in accordance with whether or not light that is to enter the light-receiving unit is interrupted. Furthermore, because the amount of light entering the light-receiving unit is limited by the amount of light projected from the light-projecting unit or the like, the detection region of the second human-presence sensor 30 is a comparatively short region.

Note that, if sensors applied as the first human-presence sensor 28 and the second human-presence sensor 30 can individually achieve functions described below, each of the sensors applied as the first human-presence sensor 28 and the second human-presence sensor 30 is not limited to a pyroelectric sensor or a reflection-type sensor.

A pattern of applying the first human-presence sensor 28 and the second human-presence sensor 30 having the above-mentioned configurations needs to be set in accordance of the operation state (mode state) of the image processing apparatus 10.

FIG. 5 is a timing chart illustrating individual mode states of the image processing apparatus 10 and events that provide opportunities for shifting from one mode state to another mode state among the mode states.

When processing is not performed, regarding the operation state of the image processing apparatus 10, the image processing apparatus 10 enters the sleep mode. In the present exemplary embodiment, power is supplied only to the during-power-saving monitoring control section 24.

Here, when there is an opportunity for cycle-up (when a cycle-up trigger is detected or an input operation (a key input) using an operation section is performed), the operation state of the image processing apparatus 10 is shifted to a warm-up mode.

Note that a power-saving cancel operation that is performed by an operator, a signal or a piece of information that are based on results of detection performed by the first human-presence sensor 28 and the second human-presence sensor 30, or the like is used as the cycle-up trigger.

In order to cause the image processing apparatus 10 to promptly enter a state in which processing can be performed, a power consumption in the warm-up mode is the largest among power consumptions in the individual modes. However, for example, an induction heating (IH) heater is utilized as a heater of the fixing unit, whereby a warm-up-mode time is comparatively shorter than that in a case of utilizing a heater using a halogen lamp.

When a warm-up operation in the warm-up mode finishes, the operation mode of the image processing apparatus 10 is shifted to a standby mode.

The standby mode is literally a mode in which "preparation for cases is completed". The image processing apparatus 10 is in a state in which an operation associated with image processing can be immediately performed.

Accordingly, when an operation for performing a job is performed as a key input, the operation state of the image processing apparatus 10 is shifted to a running mode. Image processing based on the specified job is performed.

When image processing finishes (in a case in which multiple sequential jobs wait, when all of the sequential jobs finish), the operation state of the image processing apparatus 10 is shifted to the standby mode. If an instruction for performing a job is provided during the standby mode, the operation state of the image processing apparatus 10 is shifted to the running mode again. When a cycle-down trigger is detected or when a time that is determined in advance elapses, the operation state of the image processing apparatus 10 is shifted to the sleep mode.

Note that a signal or a piece of information that are based on results of detection performed by the first human-presence sensor 28 and the second human-presence sensor 30, or the like is used as the cycle-down trigger.

Note that, shifting the operation state of the image processing apparatus 10 from one mode state to another mode state among the mode states when the image processing apparatus 10 operates in reality is not always performed in a sequential order illustrated in the timing chart. For example, processing may be stopped in the standby mode after the warm-up mode, and the operation state of the image processing apparatus 10 may be shifted to the sleep mode.

In the individual mode states that are described above, the first human-presence sensor 28 and the second human-presence sensor 30 have a function of providing opportunities for the following operation situations.

(First Operation Situation) Control of Shifting to Standby Mode Because Body Capable of Movement (User) has been Detected During Sleep Mode During the sleep mode, power may always be supplied to each of the first human-presence sensor 28 and the second human-presence sensor 30. However, first, power is supplied only to the first human-presence sensor 28 that monitors the surroundings of the image processing apparatus 10. At a point in time when a body capable of movement (a user) is detected by the first human-presence sensor 28, power may be supplied to the second human-presence sensor 30.

(Second Operation Situation) Partial-Power-Saving Control Performed on Processing Sections During Running Mode Supposing that partial power saving is performed in accordance with whether or not there are sequential jobs or in accordance with the contents of sequential jobs, when the first human-presence sensor 28 and the second human-presence sensor 30 detect that a user temporarily moves away from the image processing apparatus 10, the number of processing sections that are targets for power saving may be increased.

(Third Operation Situation) Control of Shifting to Sleep Mode Because Body Capable of Movement (User) has not been Detected During Standby Mode Control of shifting from the standby mode to the sleep mode may be performed in combination with control, which is performed using the timer, of shifting the operation state of the image processing apparatus 10.

For example, it is supposed that the timer is mainly used. In this case, when a user moves away from the image processing apparatus 10 to some extent (when the second human-presence sensor 30 no longer detects the user), the timer setting time of the timer is reduced. Furthermore, when the user is no longer completely present (when the first human-presence sensor 28 no longer detects the user), control of forcibly shifting the operation state of the image processing apparatus 10 to the sleep mode can be performed even in a case in which a time that should be measured by the timer remains.

Next, an action in the present exemplary embodiment will be described.

As described above, the operation state of the image processing apparatus 10 is shifted from one mode state to another mode state among the sleep mode, the warm-up mode, and the running mode. The amount of supplied power differs with each of the mode states.

In the image processing apparatus 10 according to the present exemplary embodiment, when conditions determined in advance are satisfied, the operation state of the image processing apparatus 10 is shifted to the sleep mode. In the sleep mode, not only supply of power to the individual devices, which are the facsimile-communication control circuit 236, the image reading section 238, and the image forming section 240, is interrupted, but also supply of power to the main controller 200 excluding the during-power-saving monitoring control section 24, and the UI touch panel 216 is interrupted. In this case, the function of the power-saving cancel button 26 connected to the main controller 200 may also be stopped. Accordingly, the image processing apparatus 10 enters a state that is almost equivalent to a state in which a main power switch is turned off when the image processing apparatus 10 is viewed from the surroundings thereof. In other words, the image processing apparatus 10 enters a state in which, by viewing from the surroundings thereof, it can be made sure that the sleep mode is assuredly set (realization of "visualization").

Here, in the present exemplary embodiment, the first human-presence sensor 28 and the second human-presence sensor 30 are applied, and the first human-presence sensor 28 and the second human-presence sensor 30 are adapted to the operation state (the individual mode states) of the image processing apparatus 10, whereby control for reducing the power consumption of the entire image processing apparatus 10 is performed.

For control using the first human-presence sensor 28 and the second human-presence sensor 30 as units that output the cycle-up trigger and the cycle-down trigger which are described above and for partial power saving in the running mode, control using the first human-presence sensor 28 and the second human-presence sensor 30 will be described below.

(Cycle-Up Trigger "Control of Shifting from Sleep Mode to Warm-Up Mode")

Regarding the first human-presence sensor 28, it is supposed that the first human-presence sensor 28 has, as a detection region (hereinafter, referred to as a "first region F"), a region larger than the detection region of the second human-presence sensor 30 in the periphery of the image processing apparatus 10. For example, the detection region of the first human-presence sensor 28 ranges about 2 m to about 3 m (see the first region F (far) illustrated in FIG. 6), although depending on the environment of a place in which the image processing apparatus 10 is disposed.

In contrast, it is supposed that the second human-presence sensor 30 has, as a detection region (hereinafter, referred to as a "second region N"), a region smaller than the detection region (the first region F) of the first human-presence sensor 28, which is described above. For example, the detection region of the second human-presence sensor 30 ranges so that a user can perform an operation on the UI touch panel 216 or the hard keys of the image processing apparatus 10, and ranges from about 0 m to about 0.5 m (see the second region N (near) illustrated in FIG. 6).

The specification of the first human-presence sensor 28 includes detection of movement of a person. The first human-presence sensor 28 is typified by, for example, an infrared ray sensor using a pyroelectric effect of a pyroelectric element.

The most distinctive feature of the first human-presence sensor 28 is that the detection region thereof is large (the detection region ranges from about 2 m to about 3 m or may range from 2 m or less to 3 m or more). Furthermore, because the first human-presence sensor 28 detects movement of a person, when a person is standing still in the detection region, the first human-presence sensor 28 does not detect the existence of the person. For example, supposing that a high-level signal is output when a person moves, when the person becomes still in the detection region, the signal changes from the high-level signal to a low-level signal.

As a matter of course, the meaning of the term "still" in the present exemplary embodiment also includes a state in which a person is completely still, as in a still image captured by a still camera or the like. However, for example, the meaning of the term "still" also includes a state in which a person is standing still in front of the image processing apparatus 10 for the sake of performing an operation. Accordingly, the meaning of the term "still" includes a state in which a person slightly moves in a range that is determined in advance (for example, movement associated with breathing) or a state in which a person moves a hand, a leg, the neck, or the like.

Note that it is not necessarily necessary to use a scheme in which the sensitivity of the first human-presence sensor 28 is adjusted after the meaning of the term "still" is defined as described above. The sensitivity of the first human-presence sensor 28 may be comparatively roughly and typically adjusted, and may depend on the detection state of the first human-presence sensor 28. In other words, when the first human-presence sensor 28 outputs one of binary signals (for example, a high-level signal), it may be indicated that a person is moving. When a person exists in the detection region of the first human-presence sensor 28 and the other signal of the binary signals (for example, a low-level signal) is output, it may be indicated that the person is standing still.

The specification of the second human-presence sensor 30 includes detection of presence/absence (existence/non-existence) of a person. The second human-presence sensor 30 is typified by, for example, a reflection-type sensor including a light-projecting unit and a light-receiving unit. Note that a configuration in which the light-projecting unit and the light-receiving unit are separated from each other may be used.

The most distinctive feature of the second human-presence sensor 30 is that the second human-presence sensor 30 reliably detects presence/absence of a person in accordance with whether or not light that is to enter the light-receiving unit is interrupted. Furthermore, because the amount of light entering the light-receiving unit is limited by the amount of light projected from the light-projecting unit or the like, the detection region of the second human-presence sensor 30 is a comparatively short region (the detection region ranges from about 0 m to about 0.5 m as described above).

Here, the first human-presence sensor 28 and the second human-presence sensor 30, which are mounted in the image processing apparatus 10 according to the present exemplary embodiment, are connected to the during-power-saving monitoring control section 24 as described above. Detection signals from the first human-presence sensor 28 and the second human-presence sensor 30 are input to the during-power-saving monitoring control section 24.

The during-power-saving monitoring control section 24 makes distinctions among the following three situations on the basis of the detection signals output from the first human-presence sensor 28 and the second human-presence sensor 30.

(First Situation)

A person approaches, for the sake of using the image processing apparatus 10, a position at which the person can perform an operation on the image processing apparatus 10.

Figure 6:
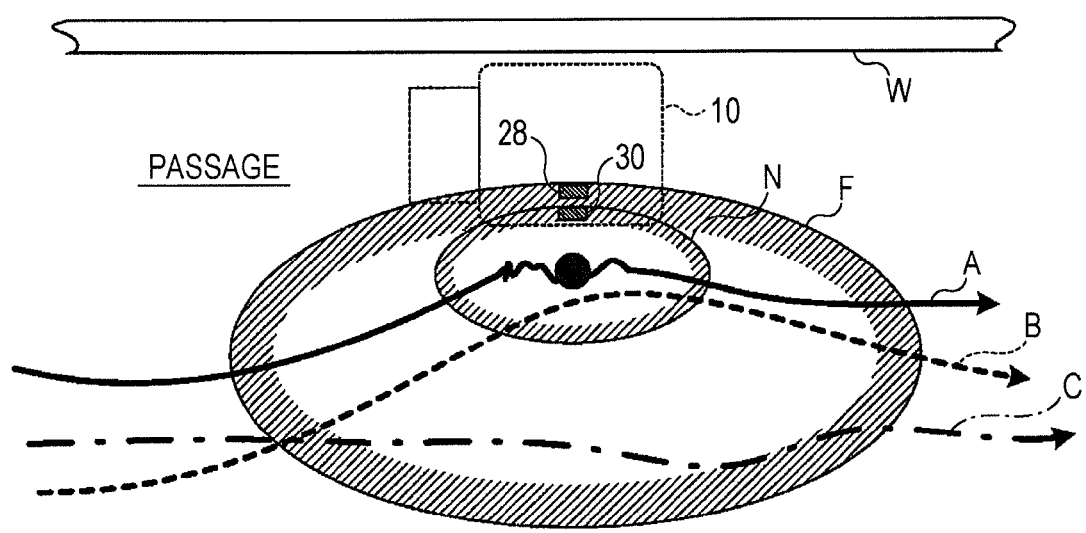
FIG. 6 is a plan view of the image processing apparatus and the periphery thereof, which illustrates an example in the present exemplary embodiment.

The distinction between the first situation and the other situations can be made by establishing the following flow: first, it is detected by the first human-presence sensor 28 that a person has entered the first region F; after that, it is detected by the second human-presence sensor 30 that the person has entered the second region N while the person is being continuously detected by the first human-presence sensor 28; and, then, the person (standing still) in the second region N is not detected by the first human-presence sensor 28 (see movement (a pattern A) indicated by the arrow A illustrated in FIG. 6).

(Second Situation)

A person approaches, not for the sake of using the image processing apparatus 10, a position at which the person can perform an operation on the image processing apparatus 10.

The distinction between the second situation and the other situations can be made by establishing the following flow: first, it is detected by the first human-presence sensor 28 that a person has entered the first region F; after that, it is detected by the second human-presence sensor 30 that the person has entered the second region N while the person is being continuously detected by the first human-presence sensor 28; the person leaves the second region N (the person is not detected by the second human-presence sensor 30) while (the movement of) the person in the second region N is being continuously detected by the first human-presence sensor 28; and, furthermore, the person leaves the first region F (the person is not detected by the first human-presence sensor 28) (see movement (a pattern B) indicated by the arrow B illustrated in FIG. 6).

(Third Situation)

Although a person does not approach a position at which the person can perform an operation on the image processing apparatus 10, the person reaches a certain position so that the situation may change from the third situation to the first or second situation.

The distinction between the third situation and the other situations can be made by establishing the following flow: first, it is detected by the first human-presence sensor 28 that a person has entered the first region F; and, after that, the person leaves the first region F (the person is not detected by the first human-presence sensor 28) while the person is not being detected by the second human-presence sensor 30 (see movement (a pattern C) indicated by the arrow C illustrated in FIG. 6).

The during-power-saving monitoring control section 24 determines the three types of situations, which are described above, on the basis of the detection signals of the first human-presence sensor 28 and the second human-presence sensor 30. First, the during-power-saving monitoring control section 24 supplies, on the basis of determination of the three types of situations, power to the input systems including the UI touch panel 216 and the hard keys that are connected to the main controller 200, the hard keys including the power-saving cancel button 26 and being used to provide instructions for performing a copy process and so forth. This operation state may be defined as one portion of the sleep mode. Alternatively, because the amount of supplied power increases, compared with the amount of power supplied only to the during-power-saving monitoring control section 24, this operation state may be defined as the awake mode "awk" (see description in the curly brackets provided below the range of the sleep mode illustrated in the transition diagram of FIG. 5).

After that, an operation is performed on the UI touch panel 216, the hard keys, or the like to specify a function, whereby the during-power-saving monitoring control section 24 supplies power to devices that are necessary for the function specified using the operation.

Note that, as in a case in which an operation is performed on the power-saving cancel button 26, power may be simultaneously supplied to all of the devices.

Here, in the present exemplary embodiment, for an opportunity (the cycle-up trigger) for resuming supply of power to the image processing apparatus 10 during the sleep mode as described above, the surroundings of the image processing apparatus 10 are monitored by the first human-presence sensor 28 and the second human-presence sensor 30 (hereinafter, simply referred to as the "first" and the "second" in some cases in FIG. 8). Whether a person is approaching the image processing apparatus 10 for the sake of performing an operation or not for the sake of performing an operation is distinguished, and whether or not supply of power is to be resumed is determined.

FIG. 6 is a plan view of the image processing apparatus 10 and the periphery thereof. The first region F is set at a position distant from the image processing apparatus 10 that is placed along the wall surface W, and the second region N is set at a position close to the image processing apparatus 10.

Here, in FIG. 6, patterns A to C are illustrated as patterns, which are broadly classified, of movement of a person in a state in which the image processing apparatus 10 is disposed as described above.

The pattern A indicates a movement path along which a person approaches a position at which the person can perform an operation on the image processing apparatus 10, along which the person becomes still to perform an operation for the sake of using the image processing apparatus 10, and along which the person moves away from the image processing apparatus 10. The position of the person who moves along the movement path sequentially changes as follows: outside the regions (a first stage); in the first region F (a second stage); in the second region N (a third stage, and, further, when the person becomes still, it is determined that the present stage classification is a fourth stage, so that the power saving mode is cancelled); in the first region F (the second stage); and outside the regions (the first stage).

The pattern B indicates a movement path along which a person approaches a position at which the person can perform an operation on the image processing apparatus 10, and along which the person passes by the image processing apparatus 10. The position of the person who moves along the movement path sequentially changes as follows: outside the regions (the first stage); in the first region F (the second stage); in the second region N (the third stage (the person continues moving)); in the first region F (the second stage); and outside the regions (the first stage).

The pattern C indicates a movement path along which a person passes through the vicinity of the image processing apparatus 10 without approaching a position at which the person can perform an operation on the image processing apparatus 10. The position of the person who moves along the movement path sequentially changes as follows: outside the regions (the first stage); in the first region F (the second stage); and outside the regions (the first stage).

Figure 7:
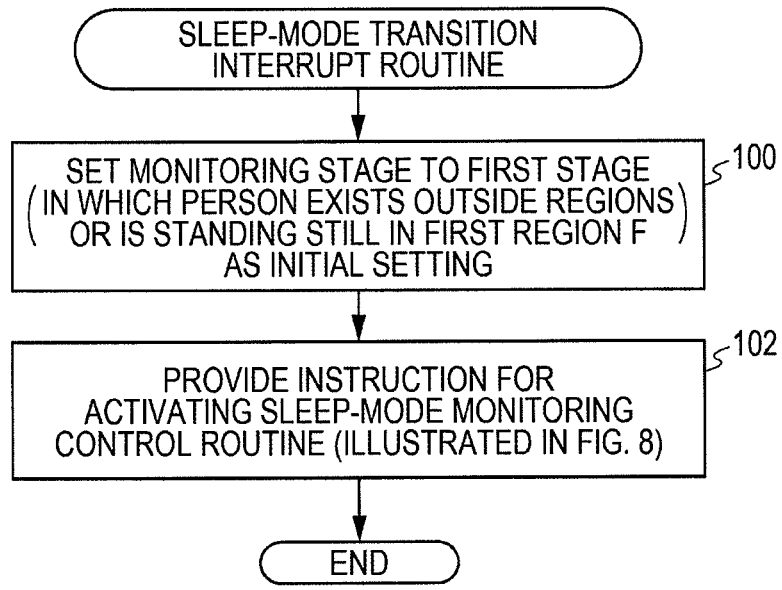
FIG. 7 is a flowchart illustrating a sleep-mode transition interrupt routine in a case of shifting to a sleep mode in the present exemplary embodiment.
Figure 8:
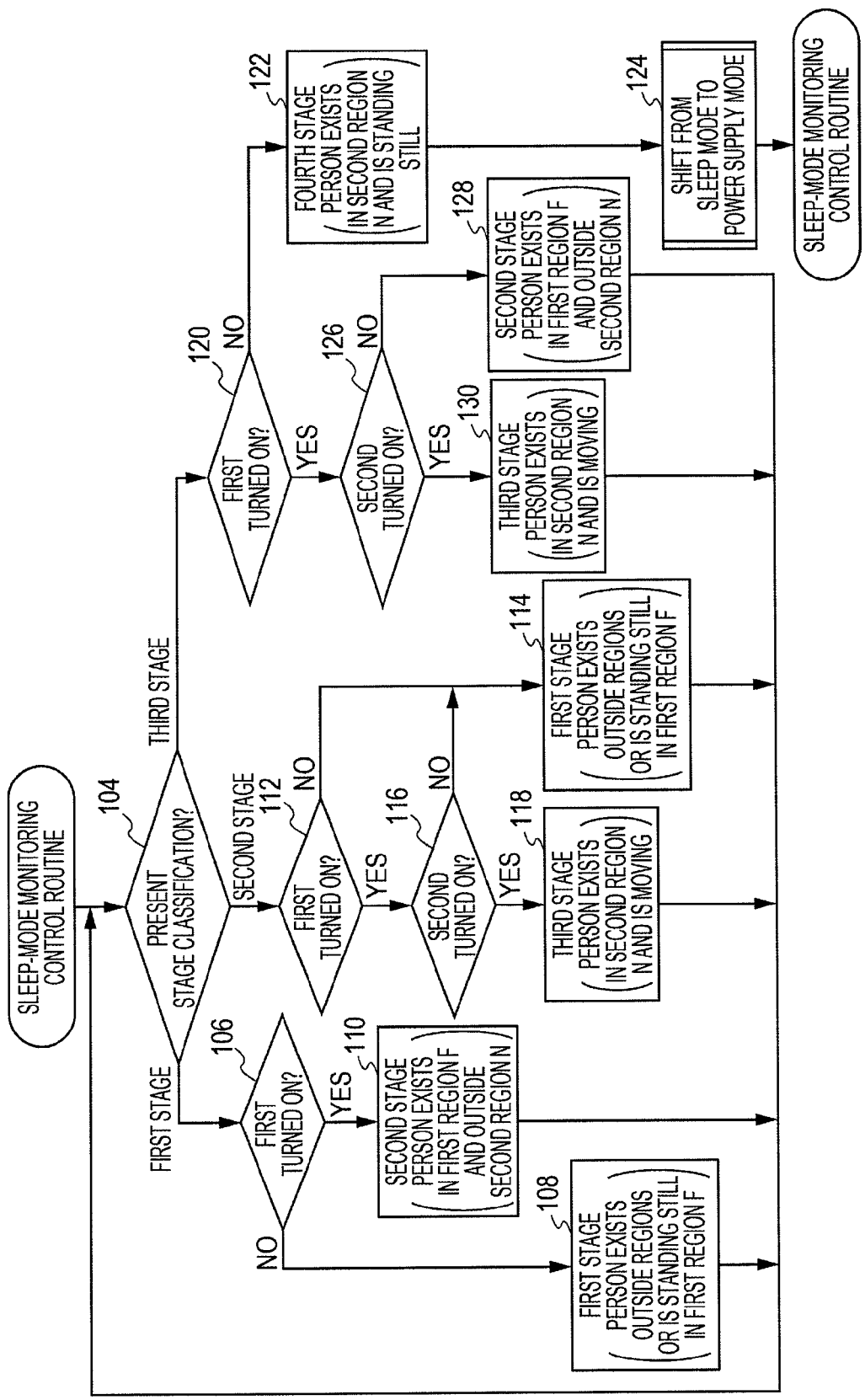
FIG. 8 is a flowchart illustrating a sleep-mode monitoring control routine in the present exemplary embodiment.

FIGS. 7 and 8 are flow diagrams illustrating routines for controlling the sleep mode.

First, referring to FIG. 7, when the image processing apparatus 10 shifts to the sleep mode, a sleep-mode transition interrupt routine is performed. In step 100, a human-presence-sensor monitoring stage, which is described below, is set to the "first stage". Next, the process proceeds to step 102, an instruction for activating a sleep-mode monitoring control routine illustrated in FIG. 8 is provided, and the shifting-to-power-saving-mode interrupt routine finishes.

FIG. 8 is a flow diagram illustrating the sleep-mode monitoring control routine.

In step 104, the present stage classification is determined.

Note that the four stages, i.e., the first to fourth stages, are set as stage classifications that are used for determination in the flow diagram illustrated in FIG. 8.

The first stage illustrates a state in which a person exists outside the first region F (see FIG. 6) or in which a person is standing still in the first region F (excluding the second region N (see FIG. 6)).

The second stage indicates a state in which a person exists in the first region F but has not reached the second region N, and in which the person is moving.

The third stage indicates a state in which a person is moving in the second region N.

The fourth stage indicates a state in which a person is standing still in the second region N.

Note that, at a point in time when the sleep-mode monitoring control routine illustrated in FIG. 8 is activated, the first stage is registered as a stage classification. Accordingly, it is determined in step 104 that the present stage classification is the first stage.

(First Stage)

When it is determined in step 104 that the present stage classification is the first stage, the process proceeds to step 106, and whether or not the first human-presence sensor 28 is turned on (whether or not the high-level signal is output) is determined. When a result of determination in step 106 is NO, i.e., when the first human-presence sensor 28 is turned off (the low-level signal is output), the process proceeds to step 108, and the present stage classification is set (updated) to be the first stage. The process returns to step 104.

Furthermore, when a result of determination in step 106 is YES, i.e., when the first human-presence sensor 28 is turned on, the process proceeds to step 110, and the present stage classification is set (updated) to be the second stage. The process returns to step 104.

(Second Stage)

When the present stage classification is the second stage in step 104, the process proceeds to step 112, and whether or not the first human-presence sensor 28 is turned on is determined. When a result of determination in step 112 is NO, i.e., when the first human-presence sensor 28 is turned off, the process proceeds to step 114, and the present stage classification is set (updated) to be the first stage. The process returns to step 104.

Furthermore, when a result of determination in step 112 is YES, i.e., when the first human-presence sensor 28 is turned on, the process proceeds to step 116, and whether or not the second human-presence sensor 30 is turned on is determined. When a result of determination in step 116 is NO, i.e., when the second human-presence sensor 30 is turned off, the process proceeds to step 114, and the present stage classification is set (updated) to be the first stage. The process returns to step 104.

Moreover, when a result of determination in step 116 is YES, i.e., when the second human-presence sensor 30 is turned on, the process proceeds to step 118, and the present stage classification is set (updated) to be the third stage. The process returns to step 104.

(Third Stage)

When it is determined in step 104 that the present stage classification is the third stage, the process proceeds to step 120, and whether or not the first human-presence sensor 28 is turned on is determined. When a result of determination in step 120 is NO, i.e., when the first human-presence sensor 28 is turned off, the process proceeds to step 122, and the present stage classification is set to be the fourth stage.

(Fourth Stage)

The fourth stages indicates a state in which a person is standing still in front of the image processing apparatus 10. Accordingly, in other words, it is supposed that a person is close to the image processing apparatus 10 and is standing still for the sake of performing an operation on the image processing apparatus 10. The process proceeds from step 122 to step 124. The CPU 204 of the main controller 200 is instructed to shift from the sleep mode to a mode state that is a power-supply state. The sleep-mode monitoring control routine finishes.

When the main controller 200 is instructed to shift to the mode state that is a power-supply state, the main controller 200 at least activates the functions (which includes a backlight) of the UI touch panel 216, and enables an operation that is to be performed on the hard keys including the power-saving cancel button 26. The main controller 200 causes the image processing apparatus 10 to enter a state in which the image processing apparatus 10 waits for an operation performed by a user.

As a result, when a user performs, for example, an operation for copying on the UI touch panel 216 or the like that receives minimum necessary power, power is supplied to the image reading section 238 and the image forming section 240.

As illustrated in FIG. 8, when a result of determination in step 120 is YES, i.e., when the first human-presence sensor 28 is turned on, the process proceeds to step 126, and whether or not the second human-presence sensor 30 is turned on is determined. When a result of determination in step 126 is NO, i.e., when the second human-presence sensor 30 is turned off, the process proceeds to step 128, and the present stage classification is set (updated) to be the second stage. The process returns to step 104.

Furthermore, when a result of determination in step 126 is YES, i.e., when the second human-presence sensor 30 is turned on, the process proceeds to step 130, and the present stage classification is set (updated) to be the third stage. The process returns to step 104.

Figure 9:
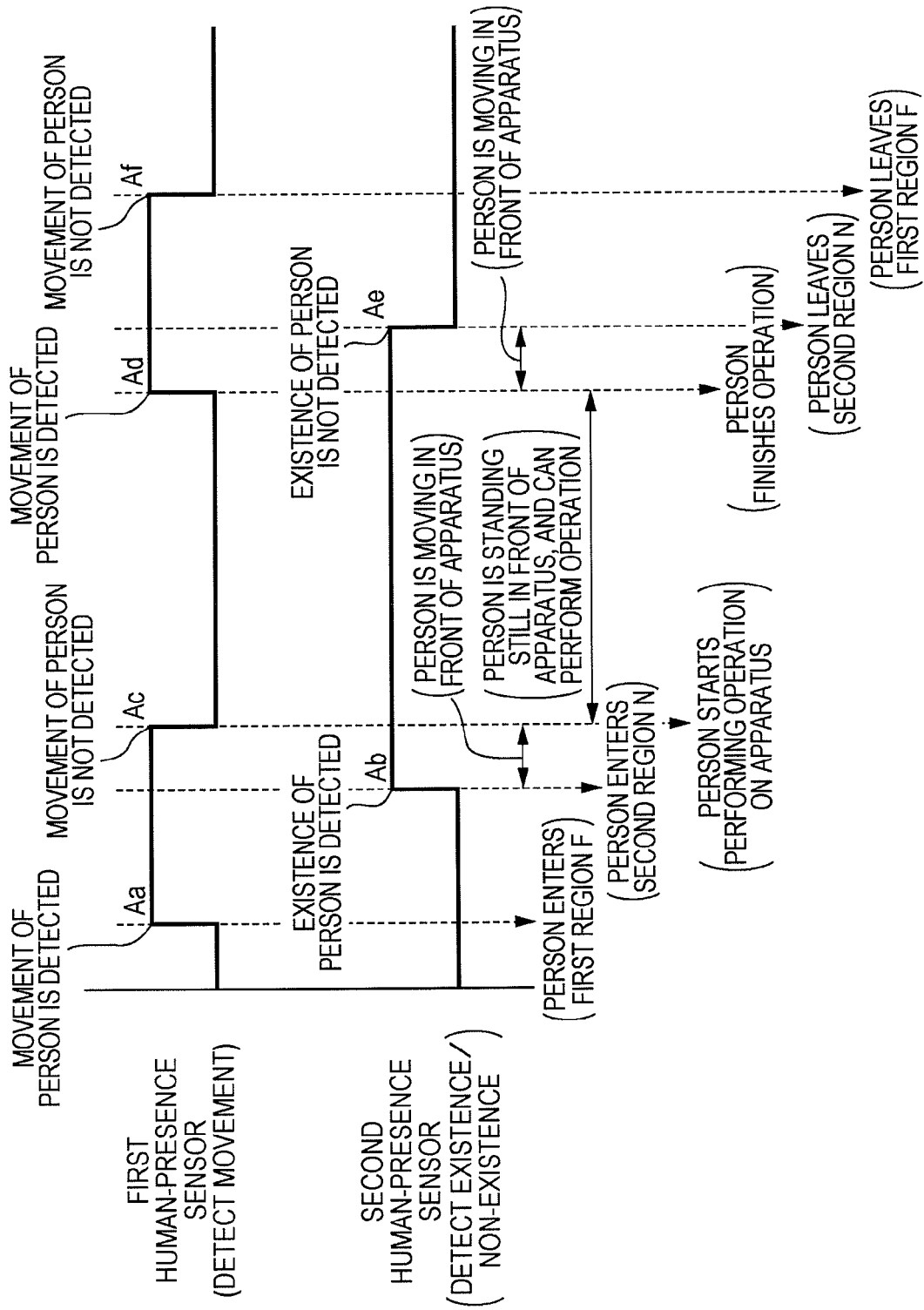
FIG. 9 illustrates a timing chart of a pattern A illustrated in FIG. 6, in which timing is illustrated using detection signals output from a first human-presence sensor and a second human-presence sensor.
Figure 10:
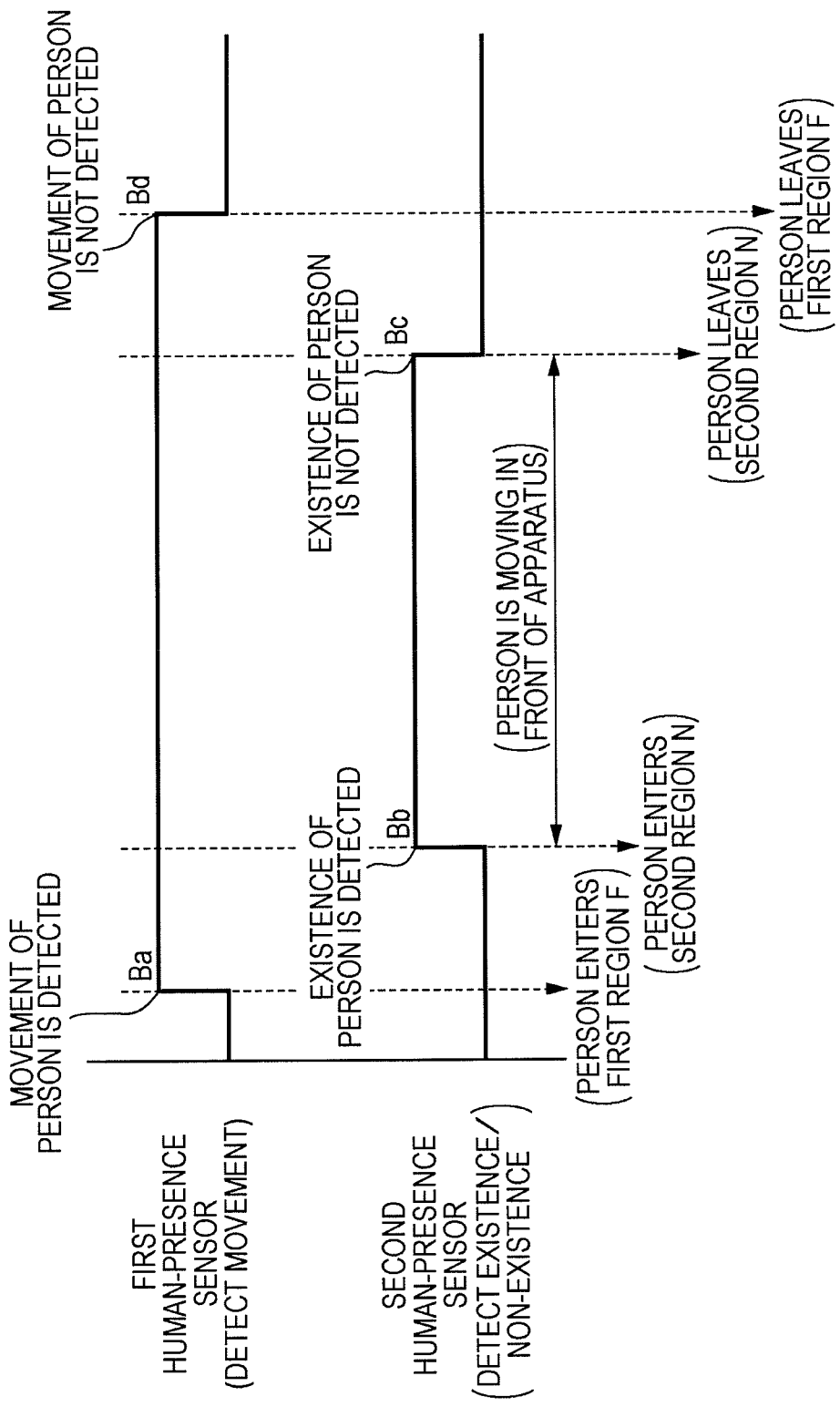
FIG. 10 illustrates a timing chart of a pattern B illustrated in FIG. 6, in which timing is illustrated using the detection signals output from the first human-presence sensor and the second human-presence sensor.
Figure 11:
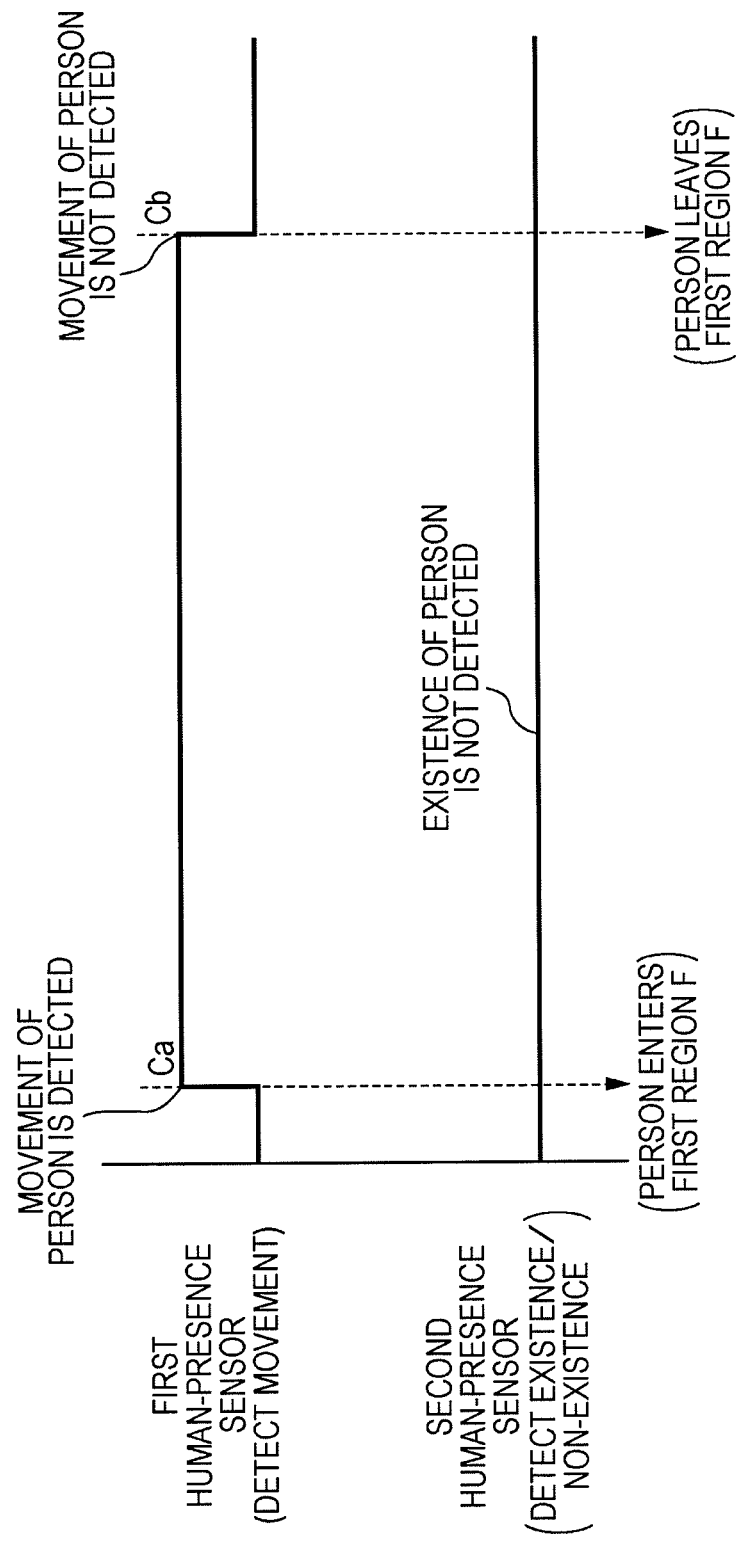
FIG. 11 illustrates a timing chart of a pattern C illustrated in FIG. 6, in which timing is illustrated using the detection signals output from the first human-presence sensor and the second human-presence sensor.

FIGS. 9 to 11 illustrate specific examples in which whether a person approaches the image processing apparatus 10 for the sake of using the image processing apparatus 10 or not for the sake of using the image processing apparatus 10 is determined in a case in which the first human-presence sensor 28 and the second human-presence sensor 30 are used as units that output the cycle-up trigger.

(Pattern A)

FIG. 9 illustrates a timing chart of the pattern A, in which timing is illustrated using the detection signals output from the first human-presence sensor 28 and the second human-presence sensor 30.

First, movement of a person is detected by the first human-presence sensor 28 (see Aa illustrated in FIG. 9). While the movement of the person is being continuously detected, the existence of the person is detected by the second human-presence sensor 30 (see Ab illustrated in FIG. 9).

At this point in time, the person only exists in front of the image processing apparatus 10, and whether the person exists in front of the image processing apparatus 10 for the sake of performing an operation or for the sake of passing by the image processing apparatus 10 is unknown.

Next, while the existence of the person is being detected by the second human-presence sensor 30, the movement of the person is no longer detected by the first human-presence sensor 28 (see Ac illustrated in FIG. 9). This state indicates that the person suddenly stands still. It is determined that the person intends to perform an operation on the image processing apparatus 10, and the sleep mode is cancelled.

When the person moves away from the image processing apparatus 10, first, movement of the person is detected by the first human-presence sensor 28 while the existence of the person is being detected by the second human-presence sensor 30 (see Ad illustrated in FIG. 9). Next, the existence of the person is no longer detected by the second human-presence sensor 30 (see Ae illustrated in FIG. 9). Finally, the movement of the person is no longer detected by the first human-presence sensor 28 (see Af illustrated in FIG. 9), thereby recognizing that the person has moved away from the image processing apparatus 10 (has moved away to a position farther than the first region F).

Note that, in the present exemplary embodiment, determination of a state in which the person moves away from the image processing apparatus 10 is not necessarily necessary.
(Pattern B)

FIG. 10 illustrates a timing chart of the pattern B, in which timing is illustrated using the detection signals output from the first human-presence sensor 28 and the second human-presence sensor 30.

First, movement of a person is detected by the first human-presence sensor 28 (see Ba illustrated in FIG. 10). While the movement of the person is being detected, the existence of the person is detected by the second human-presence sensor 30 (see Bb illustrated in FIG. 10).

At this point in time, the person only exists in front of the image processing apparatus 10, and whether the person exists in front of the image processing apparatus 10 for the sake of performing an operation or for the sake of passing by the image processing apparatus 10 is unknown.

Next, while the movement of the person is being continuously detected by the first human-presence sensor 28, the existence of the person is no longer detected by the second human-presence sensor 30 (see Bc illustrated in FIG. 10). Finally, the movement of the person is no longer detected by the first human-presence sensor 28 (see Bd illustrated in FIG. 10), thereby recognizing that the person has moved away from the image processing apparatus 10 (has moved away to a position farther than the first region F).
(Pattern C)

FIG. 11 illustrates a timing chart of the pattern C, in which timing is illustrated using the detection signals output from the first human-presence sensor 28 and the second human-presence sensor 30.

First, movement of a person is detected by the first human-presence sensor 28 (see Ca illustrated in FIG. 11). While the movement of the person is being detected, the existence of the person is not detected by the second human-presence sensor 30. The movement of the person is no longer detected by the first human-presence sensor 28 (see Cb illustrated in FIG. 11), thereby recognizing that the person has moved away from the image processing apparatus 10 (has moved away to a position farther than the first region F).

Note that, in the present exemplary embodiment, power during the sleep mode (power utilized to activate the during-power-saving monitoring control section 24) is supplied from the mains power source 242. However, if the during-power-saving monitoring control section 24 operates using power supplied from an internal battery, a solar cell, or a rechargeable battery that is charged during a mode state which is a power-supply state, supply of power from the mains power source 242 is completely interrupted in the sleep mode.

Control of Applying Human-Presence Sensors in Running Mode

In a normal case, a timer is applied as a unit that outputs the cycle-down trigger. In a case of shifting from the running mode via the standby mode to the sleep mode, there is a condition where image processing is not performed at all during a time period that is determined in advance.

In the case of shifting to the sleep mode as a result of measuring a time with the timer, it is assumed that all of the processing sections do not operate. In other words, except a case in which a specific process is specified in the sleep mode, when an image read process is preformed after a copy process has been performed, the timer is not activated. Accordingly, power is supplied to the image forming section 240 and the facsimile-communication control circuit 236 to which power does not need to be supplied. In this case, it is difficult to say that full use of a function of partial power saving is made.

However, in contrast, depending on the next job, there may be a case in which supply of power to the processing sections that do not operate should continue.

For this reason, whether or not a user who is responsible for a job that is currently being processed (a user who has provided an instruction for performing a process and who is waiting in front of the image processing apparatus 10) exists is determined on the basis of detection information concerning detection performed by the first human-presence sensor 28 and the second human-presence sensor 30. When a situation in which the user moves away from the image processing apparatus 10 although the job is being processed is recognized (when no person is detected by the first human-presence sensor 28 and the second human-presence sensor 30), supply of power to the processing sections that are not necessary to process the job is temporarily interrupted.

Furthermore, when the user returns to the image processing apparatus 10 (when a person is detected by the first human-presence sensor 28), supply of power to the processing sections to which power is not supplied because of interruption of supply of power is resumed.

In the image processing apparatus 10, when conditions determined in advance are satisfied, the operation state of the image processing apparatus 10 is shifted to the sleep mode. In the sleep mode, supply of power to the facsimile-communication control circuit 236, the image reading section 238, and the image forming section 240, the main controller 200, and the UI touch panel 216 except the communication-line detector, the FAX line detector, the during-power-saving monitoring control section 24, and so forth to which a request to return from the sleep mode is to be issued is interrupted.

Figure 12:
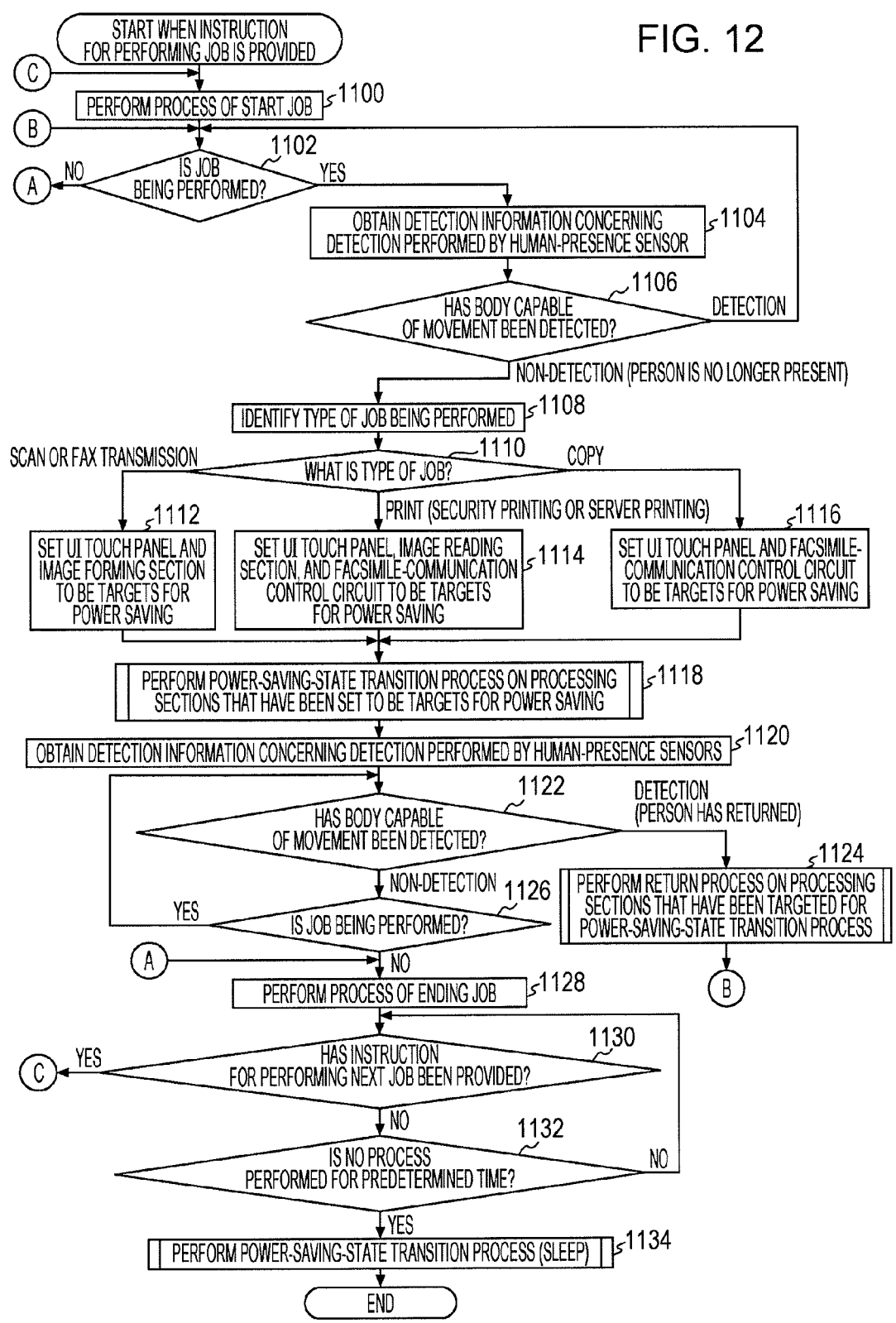
FIG. 12 is a flowchart illustrating a power-supply control routine that is performed when an instruction for performing a job is provided in the present exemplary embodiment.

FIG. 12 is a flowchart illustrating a power-supply control routine that is performed when an instruction for performing a job is provided in the present exemplary embodiment.

In step 1100, a process of starting a job is performed. In step 1102 that is the next step, whether or not the job is being performed is determined.

When a result of determination in step 1102 is NO, the flow proceeds to step 1128. Processes to be performed in step 1128 and thereafter will be described below. Furthermore, when a result of determination in step 1102 is YES, the flow proceeds to step 1104, and detection information concerning detection performed by the first human-presence sensor 28 is obtained. Next, the flow proceeds to step 1106, and whether or not a body capable of movement (which may be a user using the image processing apparatus 10) has been detected is determined.

When it is determined in step 1106 that a person has been detected, it is determined that a person who has provided an instruction for processing a job faces the image processing apparatus 10 so as to serve as a user. The flow returns to step 1102.

Furthermore, when it is determined in step 1106 that a person has not been detected, it is determined that a person who has provided an instruction for processing a job has moved away from the image processing apparatus 10 (that the person is no longer present). The flow proceeds to step 1108.

In step 1108, the type of job being performed is identified. Next, in step 1110, the job being performed is classified on the basis of the type of job that has been identified.

In other words, when it is determined in step 1110 that the type of job is "SCAN" or "FAX transmission" (an image read job or a facsimile transmission job), the flow proceeds to step 1112. The UI touch panel 216 and the image forming section 240 are selected as the processing sections (the modules) to which power does not need to be supplied for the type of job, and are set to be targets for power saving. The flow proceeds to step 1118.

Furthermore, when it is determined in step 1110 that the type of job is "PRINT" (an image record job), the flow proceeds to step 1114. The UI touch panel 216, the image reading section 238, and the facsimile-communication control circuit 236 are selected as the processing sections (the modules) to which power does not need to be supplied for the type of job, and are set to be targets for power saving. The flow proceeds to step 1118.

Moreover, when it is determined in step 1110 that the type of job is "COPY" (an image copy job), the flow proceeds to step 1116. The UI touch panel 216 and the facsimile-communication control circuit 236 are selected as the processing sections (the modules) to which power does not need to be supplied for the type of job, and are set to be targets for power saving. The flow proceeds to step 1118.

In step 1118, a power-saving-state transition process is performed on the processing sections that have been set to be targets for power saving in one of steps 1112, 1114, and 1116 which are described above. The flow proceeds to step 1120.

In step 1120, subsequently to step 1104 described above, detection information concerning detection performed by the first human-presence sensor 28 and the second human-presence sensor 30 is obtained again. Next, the flow proceeds to step 1122, and whether or not a body capable of movement (which may be a user using the image processing apparatus 10) has been detected is determined.

When it is determined in step 1122 that a person has been detected, it is determined that the person (the user) who provided an instruction for processing a job has returned to the image processing apparatus 10. The flow proceeds to step 1124. A return process is performed on the processing sections that have been targeted for the power-saving-state transition process performed in step 1118. The flow proceeds to step 1102.

Additionally, when it is determined in step 1122 that a person has not been detected, it is determined that the person who provided an instruction for processing a job and who is a user moved away from the image processing apparatus 10 has not returned to the image processing apparatus 10. The flow proceeds to step 1126.

In step 1126, whether or not the job is still being performed is determined. When a result of determination is YES, the flow proceeds to step 1122.

Furthermore, when a result of determination in step 1126 is NO, i.e., when it is determined that the job has finished, the flow proceeds to step 1128. Regarding step 1128, also when a result of determination in step 1102 described above is NO, the flow proceeds to step 1128.

In step 1128, a process of ending the job is performed. Next, the flow proceeds to step 1130, and whether or not an instruction for performing the next job has been provided is determined. When a result of determination in step 1130 is YES, the flow returns to step 1100. The power-supply control routine is performed from the beginning thereof. Moreover, when a result of determination in step 1130 is NO, the flow proceeds to step 1132, and whether or not no process is performed for a predetermined time is determined. When a result of determination is NO, the flow returns to step 1130. Until a result of determination in step 1130 is YES or until a result of determination in step 1132 is YES, steps 1130 and 1132 are repeatedly performed.

When a result of determination in step 1132 is YES, it is determined that processing performed on the next job has finished and the predetermined time has elapsed, and the flow proceeds to step 1134. The power-saving-state transition process is performed on all of the processing sections so that the image processing apparatus 10 is set to be in the sleep mode, and the power-supply control routine ends. Note that, in the present exemplary embodiment, the sleep mode of the image processing apparatus 10 is a state in which power is supplied only to minimum necessary elements that are one portion of the main controller 200 (for example, the during-power-saving monitoring control section 24), the power-saving cancel button 26, the communication-line detector, and the FAX-line detector. For example, when a user performs a job of reading a large number of documents using "SCAN", the user may move away from the image processing apparatus 10 because the job takes time. However, the image forming section 240 and so forth can be set to be in the power-saving state in accordance with the absence of the user while the job is being performed. Moreover, if the user returns to the image processing apparatus 10 while the job is being performed, each of the states of the image forming section 240 and so forth is returned to the original state. Accordingly, after the job finishes, the user can continue the next job without waiting until each of the states of the image forming section 240 and so forth is returned to the original state.

First Modification

Figure 13:
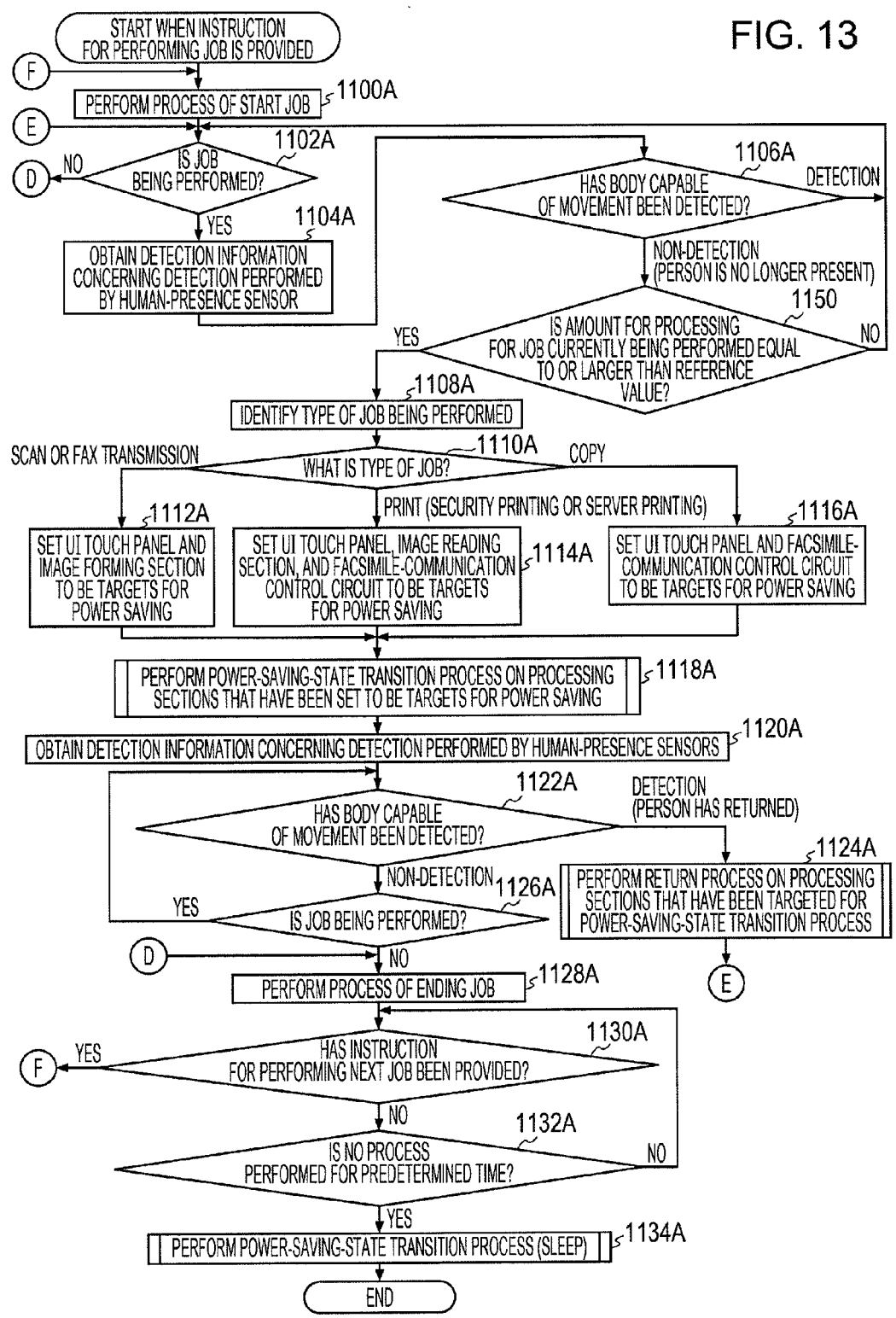
FIG. 13 is a flowchart illustrating a first modification of the power-supply control routine that is performed when an instruction for performing a job is provided.

FIG. 13 is a flowchart illustrating a modification (a first modification) of the power-supply control routine that has been described with reference to FIG. 12 and that is performed when an instruction for performing a job is provided.

In the above-described exemplary embodiment, when a user who is responsible for a job that is currently being processed is no longer present in front of the image processing apparatus 10 (when a reference time has elapsed since the user was no longer present), the power-saving-state transition process is performed on the processing sections that are not performing the job.

In contrast, in the first modification, in addition to the condition for the power-saving-state transition process, which is a condition where "a person is not present", in the above-described exemplary embodiment, determination is performed on the basis of the amount of processing for a job currently being performed.

Note that, in FIG. 13, regarding steps in which processes that are the same as the processes performed in steps illustrated in the flowchart of FIG. 12 are performed, "A" is added to each of the ends of the same reference numerals, and a description thereof is omitted.

Referring to FIG. 13, step 1150 is added between steps 1106A and 1108A.

When it is determined in step 1106A that a person has not been detected, the flow proceeds to step 1150. In step 1150, whether or not the amount of processing for a job currently being performed is equal to or larger than a reference value is determined. When a result of determination is NO, the flow proceeds to step 1102A. When a result of determination is YES, the flow proceeds to step 1108A.

Examples of a condition represented by a value that may be used as the reference value for the amount of processing include the following: (1) a condition where twenty seconds or longer has elapsed since a job started; (2) a condition where the number of sheets being processed is fifty or larger; and (3) a condition where a processing time that is obtained by conversion from the number of sheets being processed is equal to or longer than twenty seconds. However, the reference value is not limited to any one of values representing the conditions (1) to (3). In a case in which the amount of processing for a job is smaller than the reference value, even when a person is no longer present, the processing sections are not set to be in the power-saving state. Accordingly, even when a user moves away from the image processing apparatus 10, for example, in order to prepare the next document while a short job is being performed, there is not a wait time for a return from the power-saving state. Energy saving performance for a long job and convenience for a short job can be automatically realized.

Second Modification

Figure 14:
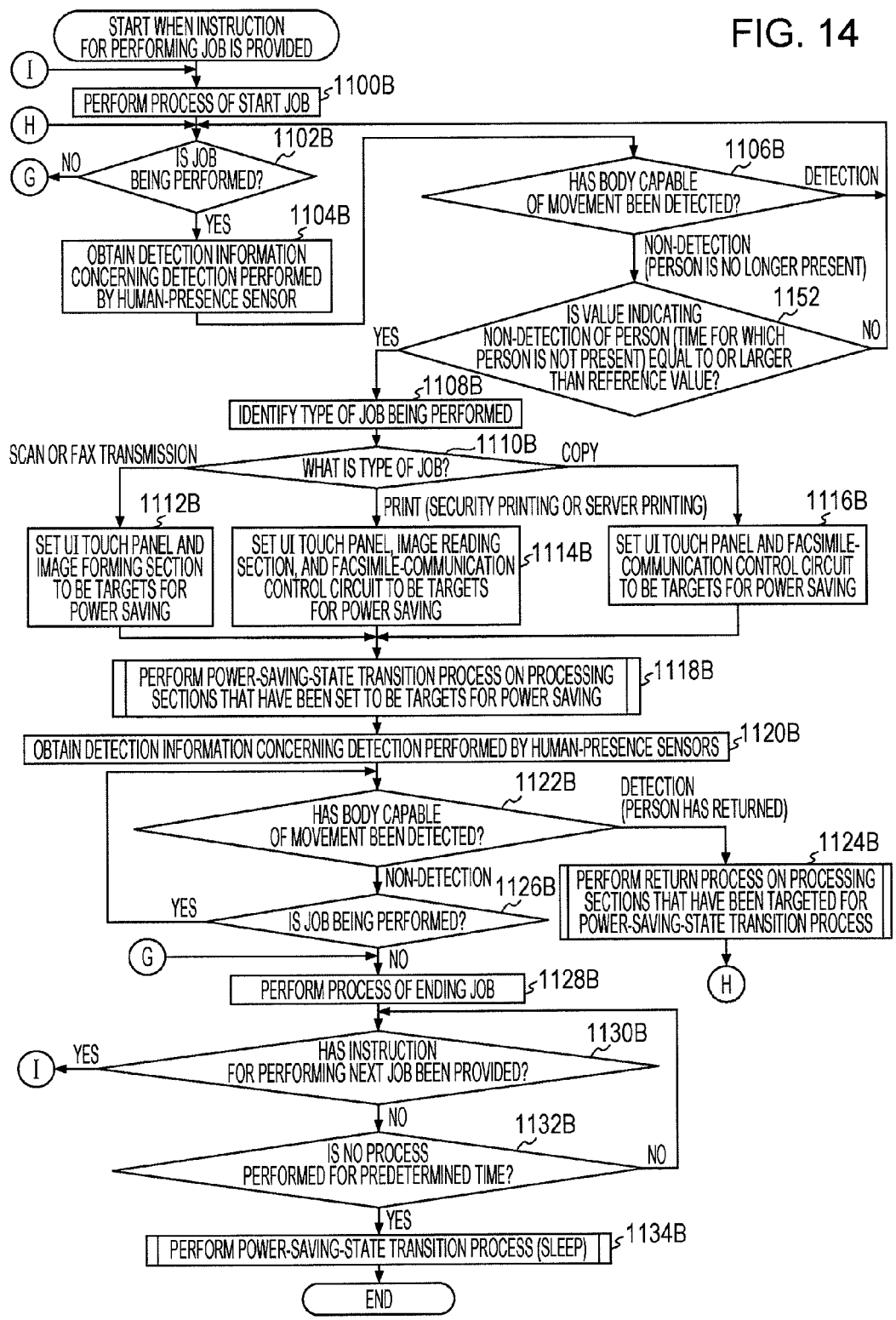
FIG. 14 is a flowchart illustrating a second modification of the power-supply control routine that is performed when an instruction for performing a job is provided.

FIG. 14 is a flowchart illustrating a modification (a second modification) of the power-supply control routine that has been described with reference to FIG. 12 and that is performed when an instruction for performing a job is provided.

In the above-described exemplary embodiment, when a user who is responsible for a job that is currently being processed is no longer present in front of the image processing apparatus 10 (when a reference time has elapsed since the user was no longer present), the power-saving-state transition process is performed on the processing sections that are not performing the job.

In contrast, in the second modification, in addition to the condition for the power-saving-state transition process, which is a condition where "a person is not present", in the above-described exemplary embodiment, determination is performed on the basis of whether or not, since the person was no longer present, the absence of a person has continued so that a value indicating the absence of a person exceeds a reference value.

Note that, in FIG. 14, regarding steps in which processes that are the same as the processes performed in steps illustrated in the flowchart of FIG. 12 are performed, "B" is added to each of the ends of the same reference numerals, and a description thereof is omitted.

Referring to FIG. 14, step 1152 is added between steps 1106B and 1108B.

When it is determined in step 1106B that a person has not been detected, the flow proceeds to step 1152. In step 1152, whether or not a value indicating non-detection of a person (a time for which a person is not present) is equal to or larger than a reference value is determined. When a result of determination is NO, the flow proceeds to step 1102B. When a result of determination is YES, the flow proceeds to step 1108B.

Examples of a condition represented by a value that may be used as the reference value for the time for which a person is not present include a condition where ten seconds or longer has elapsed since a person was no longer detected. However, the reference value is not limited to a value representing the condition.

Third Modification

Figure 15:
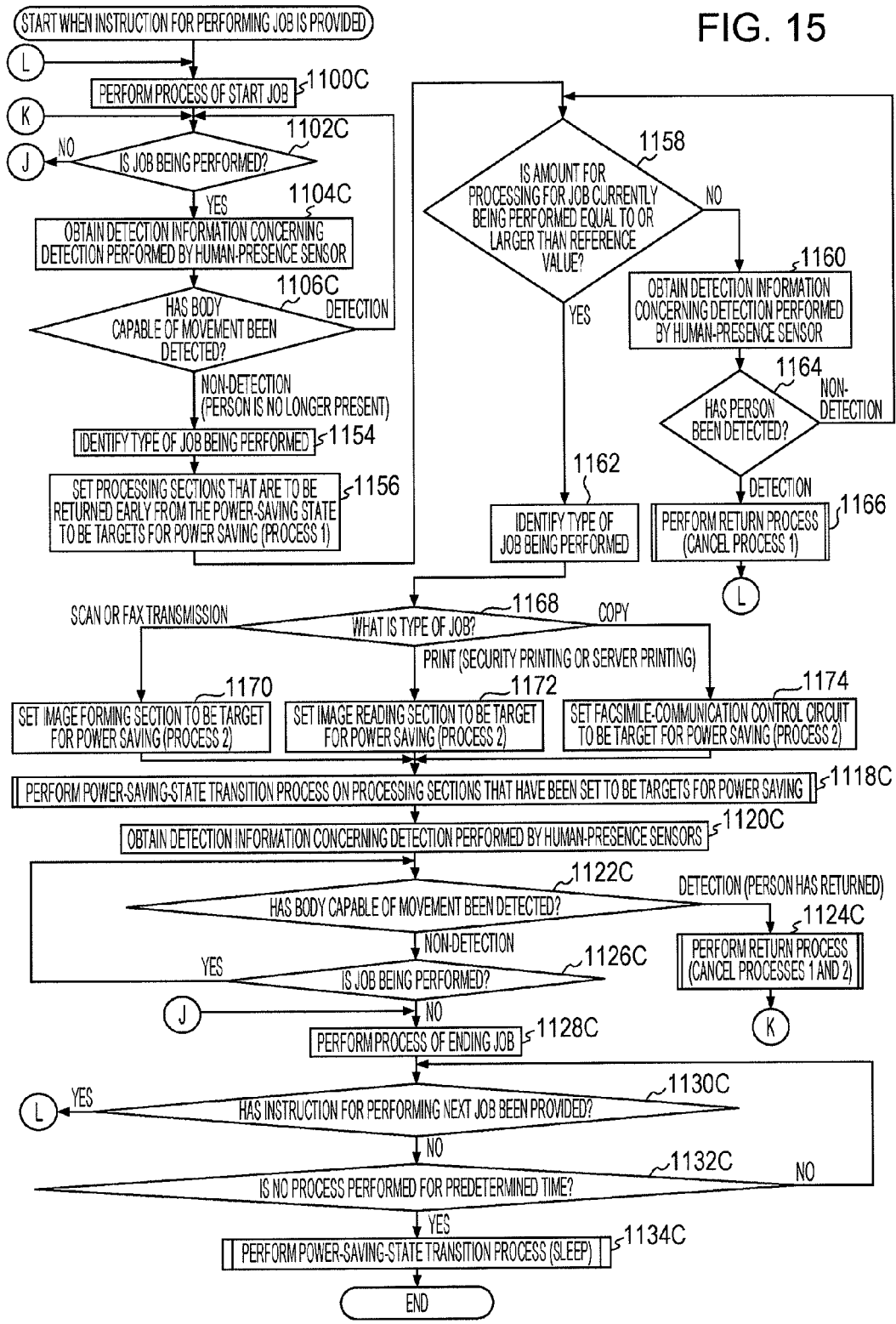
FIG. 15 is a flowchart illustrating a third modification of the power-supply control routine that is performed when an instruction for performing a job is provided.

FIG. 15 is a flowchart illustrating a modification (a third modification) of the power-supply control routine that has been described with reference to FIG. 12 and that is performed when an instruction for performing a job is provided.

In the above-described exemplary embodiment, when a user who is responsible for a job that is currently being processed is no longer present in front of the image processing apparatus 10 (when a reference time has elapsed since the user was no longer present), the power-saving-state transition process is performed on the processing sections that are not performing the job.

In contrast, in the third modification, in addition to the condition for the power-saving-state transition process, which is a condition where "a person is not present", in the above-described exemplary embodiment, determination is performed on the basis of the amount of processing for a job currently being performed, and steps (processes 1 and 2) are sets for the power-saving-state transition process.

The process 1 is a power-saving-state transition process for which the processing sections that are to be returned early from the power-saving state are targeted. For example, one of the processing sections that are to be returned early from the power-saving state is the UI touch panel 216.

The process 2 is a power-saving-state transition process for which the processing sections that are to be returned late from the power-saving state are targeted. For example, the processing sections that are to be returned late from the power-saving state are the facsimile-communication control circuit 236, the image reading section 238, and the image forming section 240.

Note that the image reading section 238 may be classified as a processing section that is to be returned early from the power-saving state, depending on the type of image processing apparatus 10.

Note that, in FIG. 15, regarding steps in which processes that are the same as the processes performed in steps illustrated in the flowchart of FIG. 12 are performed, "C" is added to each of the ends of the same reference numerals, and a description thereof is omitted.

Referring to FIG. 15, steps in which processes are performed are added between step 1106C and step 1118C.

When it is determined in step 1106C that a person has not been detected, the flow proceeds to step 1154. In step 1154, the type of job being performed is identified. Next, the flow proceeds to step 1156. The processing sections that are to be returned early from the power-saving state are set to be targets for power saving (the process 1). The flow proceeds to step 1158.

In step 1158, whether or not the amount of processing for a job currently being performed is equal to or larger than a reference value is determined. When a result of determination is NO, the flow proceeds to step 1160. When a result of determination is YES, the flow proceeds to step 1162.

Examples of a condition represented by a value that may be used as the reference value for the amount of processing are as follows: (1) a condition where twenty seconds or longer has elapsed since a job started; (2) a condition where the number of sheets being processed is fifty or larger; and (3) a condition where a processing time that is obtained by conversion from the number of sheets being processed is equal to or longer than twenty seconds. However, the reference value is not limited to any one of values representing the conditions (1) to (3).

In step 1160, detection information concerning detection performed by the first human-presence sensor 28 is obtained. Next, the flow proceeds to step 1164, and whether or not a body capable of movement (which may be a user using the image processing apparatus 10) has been detected is determined.

When it is determined in step 1164 that a person has been detected, the flow proceeds to step 1166, and a return process is performed for the process 1. The flow proceeds to step 1100C.

When it is determined in step 1164 that a person has not been detected, the flow proceeds to step 1158.

In contrast, in step 1162, the type of job being performed is identified. Next, in step 1168, the job being processed is classified on the basis of the type of job that has been identified.

In other words, when it is determined in step 1168 that the type of job is "SCAN" or "FAX transmission" (an image read job or a facsimile transmission job), the flow proceeds to step 1170. The image forming section 240 is selected as the processing section (the module) to which power does not need to be supplied for the type of job, and is set to be a target for power saving (the process 2). The flow proceeds to step 1118C.

Furthermore, when it is determined in step 1168 that the type of job is "PRINT" (an image record job), the flow proceeds to step 1172. The image reading section 238 and the facsimile-communication control circuit 236 are selected as the processing sections (the modules) to which power does not need to be supplied for the type of job, and are set to be targets for power saving (the process 2). The flow proceeds to step 1118C.

Moreover, when it is determined in step 1168 that the type of job is "COPY" (an image copy job), the flow proceeds to step 1174. The facsimile-communication control circuit 236 is selected as the processing section (the module) to which power does not need to be supplied for the type of job, and is set to be a target for power saving (the process 2). The flow proceeds to step 1118C.

Figure 16:
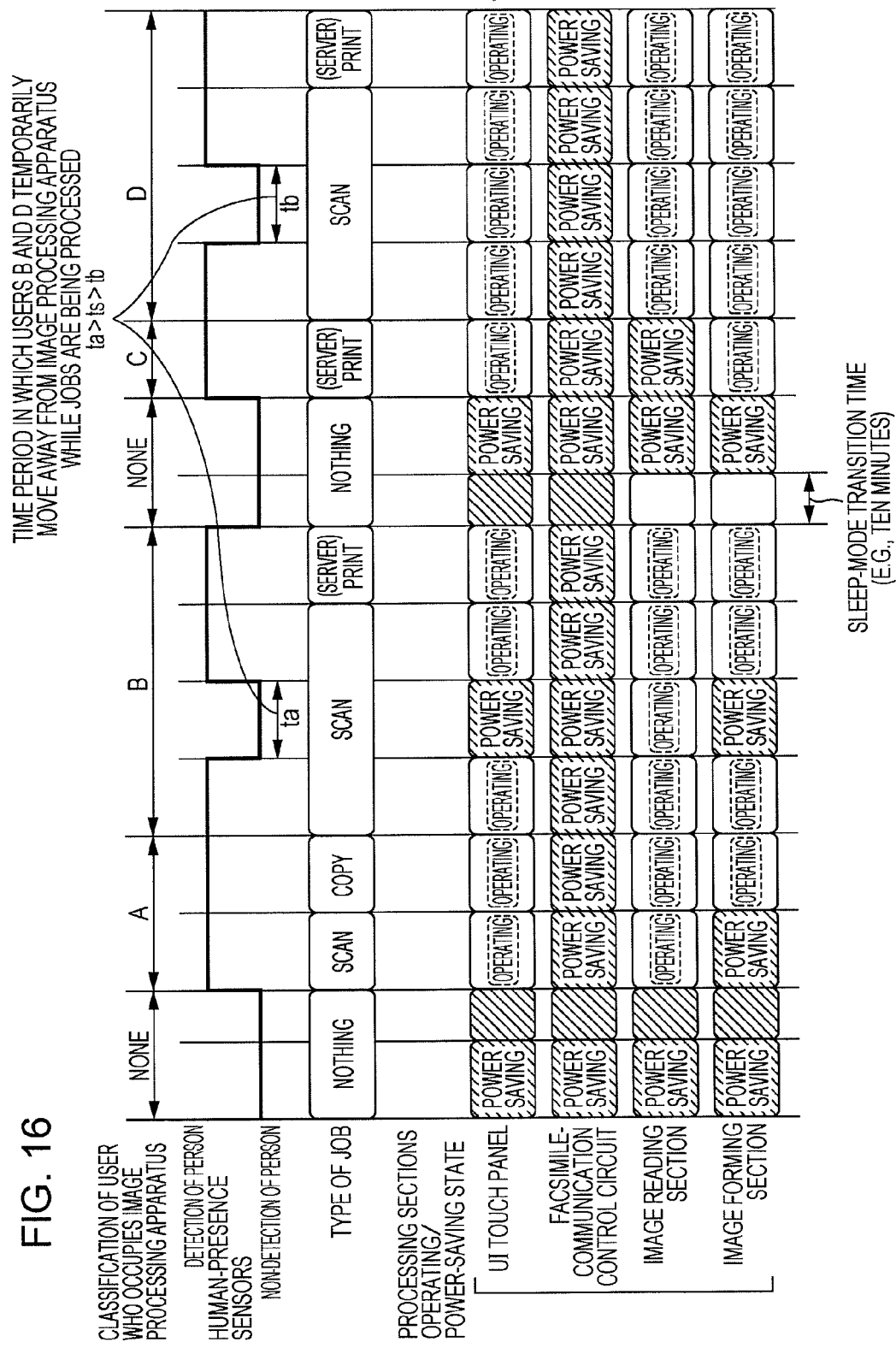
FIG. 16 is a timing chart illustrating an example in which the second modification of the power-supply control routine illustrated in FIG. 14 is performed.

FIG. 16 is a timing chart illustrating an example in which the states of the processing sections are shifted in accordance with the power-supply control routine illustrated in FIG. 14 (the second modification) given above. Note that, a human-presence sensor illustrated in the timing chart of FIG. 16 may be either the first human-presence sensor 28 or the second human-presence sensor 30, or may be a combination of both the first human-presence sensor 28 and the second human-presence sensor 30.

Users who occupy the image processing apparatus 10 while the image processing apparatus 10 is in the sleep mode, i.e., users A to D, individually perform jobs in the order of the user A, the user B, the user C, and the user D. In this case, the states of the processing sections are shifted as illustrated in FIG. 16.

The user A performs a "SCAN" job and, then, a "COPY" job as types of job. Accordingly, regarding the processing sections, first, the UI touch panel 216 and the image reading section 238 that are necessary for the "SCAN" job are caused to operate (the power-saving state of each of the facsimile-communication control circuit 236 and the image forming section 240 that are the other processing sections is maintained).

When the "SCAN" job of the user A finishes, next, the UI touch panel 216, the image reading section 238, and the image forming section 240 that are necessary for the "COPY" job are caused to operate (the power-saving state of the facsimile-communication control circuit 236 that is the other processing section is maintained).

Next, the next user B performs a "SCAN" job and, then, a "(server) PRINT" job as types of job. The "(server) PRINT" job is a job in which information that is stored in a server in advance is read in accordance with an instruction that has been provided by the user B from the image processing apparatus 10, and in which image formation is performed.

Here, because the "SCAN" job can be performed by the processing sections that currently operate (at a time at which processing finishes for the user A), the processing sections continues processing.

While the "SCAN" job of the user B is being performed, the user B moves away from the image processing apparatus 10. When a time ta for which the user B moves away from the image processing apparatus 10 is longer than a reference time (when a relationship ta>ts is established where "ts is a reference value"), the state of each of the UI touch panel 216 and the image forming section 240 that are unnecessary for the "SCAN" job being performed is shifted to the power-saving state.

Furthermore, when the user B (a person that is expected to be the user B) returns to the image processing apparatus 10, the states of the UI touch panel 216 and the image forming section 240 are shifted to the operation states that the UI touch panel 216 and the image forming section 240 had when the "SCAN" job started.

When the "SCAN" job of the user B finishes, next, the UI touch panel 216 and the image forming section 240 that are necessary for the "(server) PRINT" job are caused to operate (the power-saving state of the facsimile-communication control circuit 236 that is the other processing section is maintained).

When processing performed on the jobs for the user B finishes, the image processing apparatus 10 enters the sleep mode at a point in time when a sleep-mode transition time (for example, a time that is in the range from about one minute to about ten minutes) elapses, thereby shifting the state of each of all of the processing sections to the power-saving state.

Next, in the sleep mode, the user C performs a "(server) PRINT" job as a type of job. Accordingly, regarding the processing sections, the UI touch panel 216 and the image forming section 240 that are necessary for the "(server) PRINT" job are caused to operate (the power-saving state of each of the facsimile-communication control circuit 236 and the image reading section 238 that are the other processing sections is maintained).

After the job of the user C finishes, finally, the user D performs a "SCAN" job and, then, a "(server) PRINT" job as types of job. Accordingly, regarding the processing sections, first, the UI touch panel 216 and the image reading section 238 that are necessary for the "SCAN" job are caused to operate (the power-saving state of the facsimile-communication control circuit 236 that is the other processing section is maintained).

It is supposed that, while the "SCAN" job of the user D is being performed, the user D moves away from the image processing apparatus 10. Even in this case, when a time tb for which the user B moves away from the image processing apparatus 10 is shorter than a reference time (when a relationship ts>tb is established where "ts is a reference value"), differently from the case for the user B, the state of each of the UI touch panel 216 and the image forming section 240 that are unnecessary for the "SCAN" job being performed is not shifted to the power-saving state.

When the "SCAN" job of the user D finishes, next, the UI touch panel 216 and the image forming section 240 that are necessary for the "(server) PRINT" job are caused to operate (the power-saving state of the facsimile-communication control circuit 236 that is the other processing section is maintained).

Accordingly, when it is determined that a user is not longer detected while a job is being processed, the state of each of the processing sections that are unnecessary for the job is shifted to the power-saving state depending on a time taken to perform the job. With respect to the reference value ts, when a relationship ta>ts is established, the state of the processing section unnecessary for the job is shifted to the power-saving state. When a relationship ts>tb is established, the state of the processing section unnecessary for the job is maintained so that the processing section operates. When the operation state of the image processing apparatus 10 is returned from the sleep mode or when switching from one job to another job is performed, the processing sections that are necessary are caused, by using partial-power-saving control, to operate (the state of each of the processing sections that are necessary is returned from the power-saving state). In order to prepare for the next job, when switching from one job to another job is performed, the state of each of the processing sections is not shifted to the power-saving state. When a sleep-mode transition time (for example, ten minutes) has elapsed after processing finished for jobs, the operation state of the image processing apparatus 10 is shifted to the sleep mode.

Cycle-Down Trigger "Control of Shifting from Standby Mode to Sleep Mode"

Basically, a timer is used as a unit that outputs the cycle-down trigger. An advantage of using a timer is that the operation state of the image processing apparatus 10 is assuredly shifted to the sleep mode in a case in which the image processing apparatus 10 is not caused to operate at all even when a time determined in advance elapses.

In contrast, a disadvantage of using a timer is that, although a specified job has already finished and a user has moved away from the image processing apparatus 10, a time measured by the timer has not reached a timer setting time of the timer, so that the image processing apparatus 10 is left in a state in which the image processing apparatus 10 is not used.

As illustrated in FIG. 5, image processing is performed in the running mode. When control using a timer is performed so that a time determined in advance elapses, the operation state of the image processing apparatus 10 is shifted to the standby mode. Furthermore, when control using a timer is performed so that a time determined in advance elapses, the operation state of the image processing apparatus 10 is shifted to the sleep mode. In this case, when the operation state of the image processing apparatus 10 has been shifted to the sleep mode, the next cycle-up takes time. Accordingly, when a high priority is assigned to the convenience, the timer setting time needs to be set to be comparatively long. When a high priority is assigned to the energy saving performance, the timer setting time needs to be set to be comparatively short. In view of the tradeoffs, in reality, the timer setting time is set to be an average value.

For this reason, in the present exemplary embodiment, the first human-presence sensor 28 and the second human-presence sensor 30 are used together with a timer as units that provide an opportunity (the cycle-down trigger) for shifting from the standby mode to the sleep mode.

Figure 17:
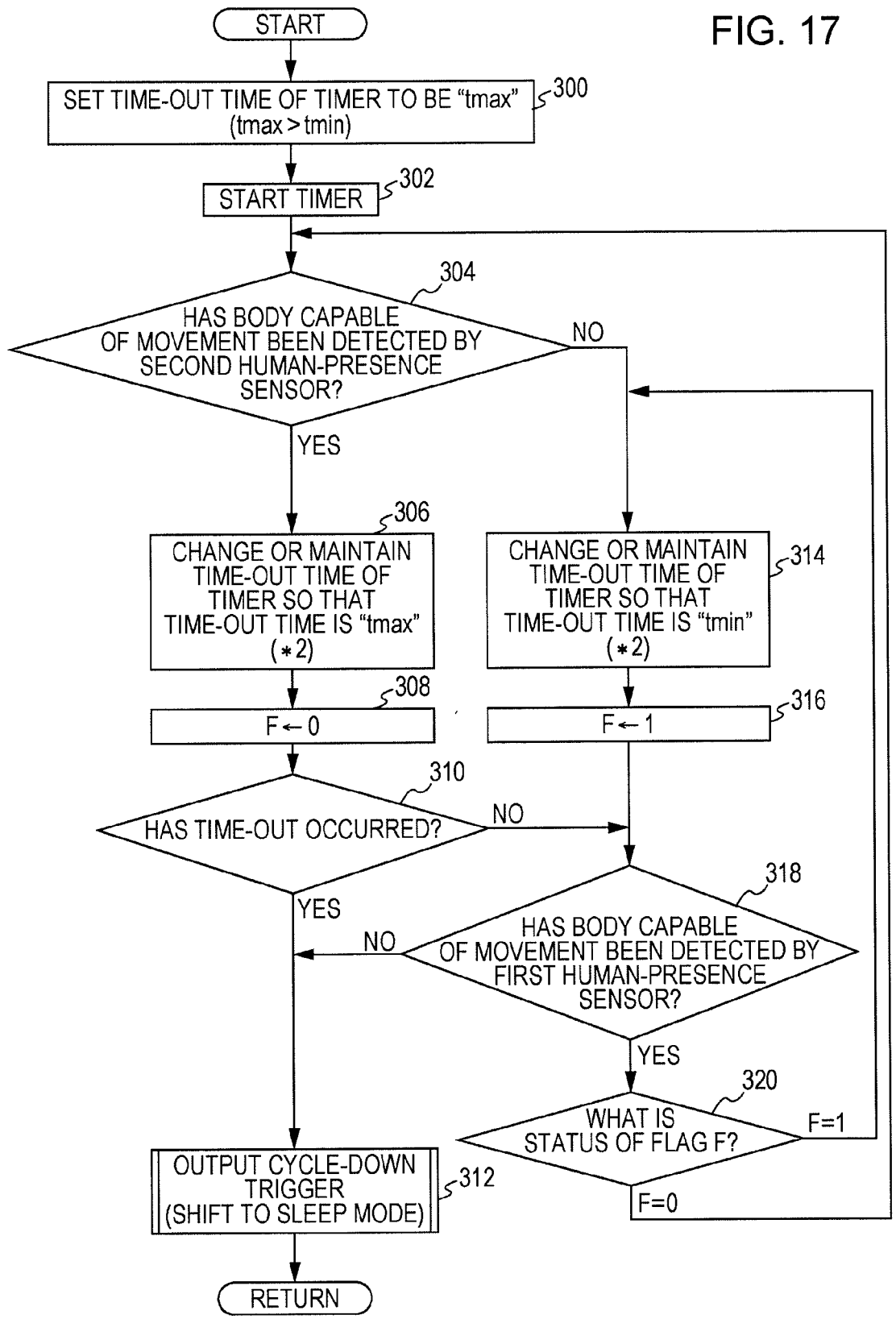
FIG. 17 is a flowchart illustrating a sleep-mode transition control routine performed in the standby mode.

FIG. 17 is a flowchart illustrating a sleep-mode transition control routine performed in the standby mode.

In step 300, a time tmax is set as a time-out time of a timer (where a relationship tmax>tmin is established). The flow proceeds to step 302.

In step 302, the timer is started. Next, the flow proceeds to step 304, and whether or not a body capable of movement (a user) has been detected by the second human-presence sensor 30 is determined. In other words, whether or not a user stands up in front of the image processing apparatus 10 (a region located in front of the image processing apparatus 10 being equivalent to the second region N illustrated in FIG. 6) is determined.

When a result of determination in step 304 is YES, the flow proceeds to step 306. The time-out time of the timer is changed or maintained so that the time-out time is the time tmax. The flow proceeds to step 308. Note that when the flow proceeds from step 302 to step 304, the time-out time is "maintained". When the flow proceeds from step 320 to step 304, which is described below, the time-out time is "changed".

In step 308, a flag F is reset (so that the status of the flag F is zero), and the flow proceeds to step 310.

In step 310, whether or not the time measured by the timer has reached the time-out time that is currently set (a time-out has occurred) is determined. When a result of determination is YES, the flow proceeds to step 312. The cycle-down trigger is output, and shifting to the sleep mode is performed. The sleep-mode transition control routine ends.

When a result of determination in step 304 described above is NO, the flow proceeds to step 314. The time-out time of the timer is changed or maintained so that the time-out time is the time tmin. The flow proceeds to step 316. Note that, when the flow proceeds from step 304 to step 314, the time-out time is "changed". When the flow proceeds from step 320 to step 314, which is described below, the time-out time is "maintained".

In step 316, the flag F is set (so that the status of the flag F is one), and the flow proceeds to step 318.

Also when a result of determination in step 310 is NO, the flow proceeds to step 318.

In step 318, whether or not a body capable of movement (a user) has been detected by the first human-presence sensor 28 is determined. In other words, whether or not a user exists at a position that is farther from the image processing apparatus 10 than a position located in front of the image processing apparatus 10 is, i.e., exists in the periphery of the image processing apparatus 10 (a region located in the periphery of the image processing apparatus 10 being equivalent to the first region F illustrated in FIG. 6), is determined.

When a result of determination in step 318 is YES, the flow proceeds to step 320, and the status of the flag F is determined. When it is determined in step 320 that an equation F=0 is established, the flow returns to step 304. When it is determined in step 320 that an equation F=1 is established, the flow returns to step 314.

Furthermore, when a result of determination in step 318 is NO, the flow proceeds to step 312. Regardless of a remaining time that should be measured by the timer until a time-out occurs in the timer, the cycle-down trigger is immediately output, and shifting to the sleep mode is performed. The sleep-mode transition control routine ends.

Additional First Requirement "Arrangement of Second Human-Presence Sensor 30"

In the present exemplary embodiment, it is detected by the one first human-presence sensor 28 and the one second human-presence sensor 30 that a body capable of movement (for example, a user) approaches the image processing apparatus 10 for the sake of using the image processing apparatus 10. However, more particularly, because the detection region of the second human-presence sensor 30 is small, it is necessary to consider environmental conditions including, for example, a place in which the image processing apparatus 10 is disposed, a direction in which a user approaches the image processing apparatus 10, and a position at which the user stands up.

For this reason, a structure is used, in which multiple types of elements including a detection direction, the detection region, the shape (contour) of the detection region of the second human-presence sensor 30 can be adjusted in accordance with a state in which the image processing apparatus 10 is disposed. The detection region is limited with respect to the maximum region M by adjusting the multiple types of elements.

Figure 18A:
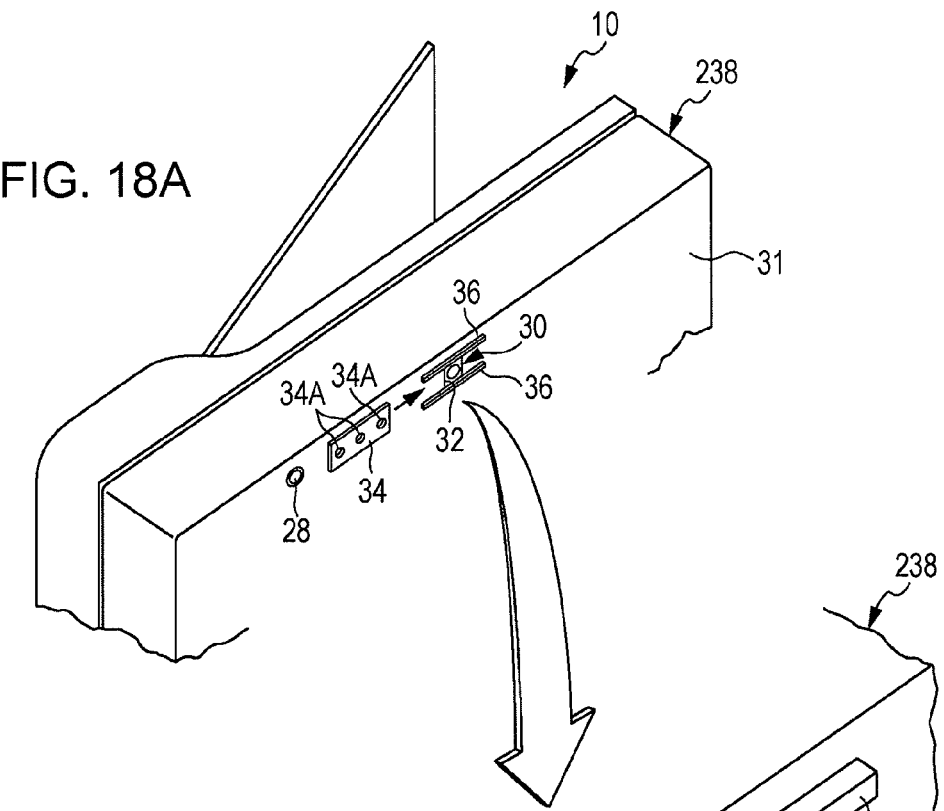
FIG. 18A is a perspective view illustrating an attachment structure of a human-presence sensor, which is attached onto the underside of an image reading section, and the periphery of the human-presence sensor.

FIG. 18 illustrates an attachment structure for attaching the first human-presence sensor 28 and the second human-presence sensor 30 onto the underside of the operation panel of the image processing apparatus 10. Note that, because the first human-presence sensor 28 is basically a sensor that performs detection so as to cover a large region (for example, a pyroelectric sensor), adjustment of the detection region is unnecessary. Thus, in the present exemplary embodiment, a fixed structure is used. However, a detection-region adjustment structure of the second human-presence sensor 30, which is described below, may be applied to the first human-presence sensor 28.

Furthermore, in the present exemplary embodiment, a position at which the first human-presence sensor 28 and the second human-presence sensor 30 are attached is located on the underside of the operation panel of the image processing apparatus 10. However, a structure may be used, in which the first human-presence sensor 28 and the second human-presence sensor 30 are attached on a support body used to place the image reading section 238 above the image forming section 240.

A rectangular groove 32 for attaching the second human-presence sensor 30 is attached onto an underside portion 31 of the operation panel. In the groove 32, the second human-presence sensor 30 is accommodated.

Figure 18B:
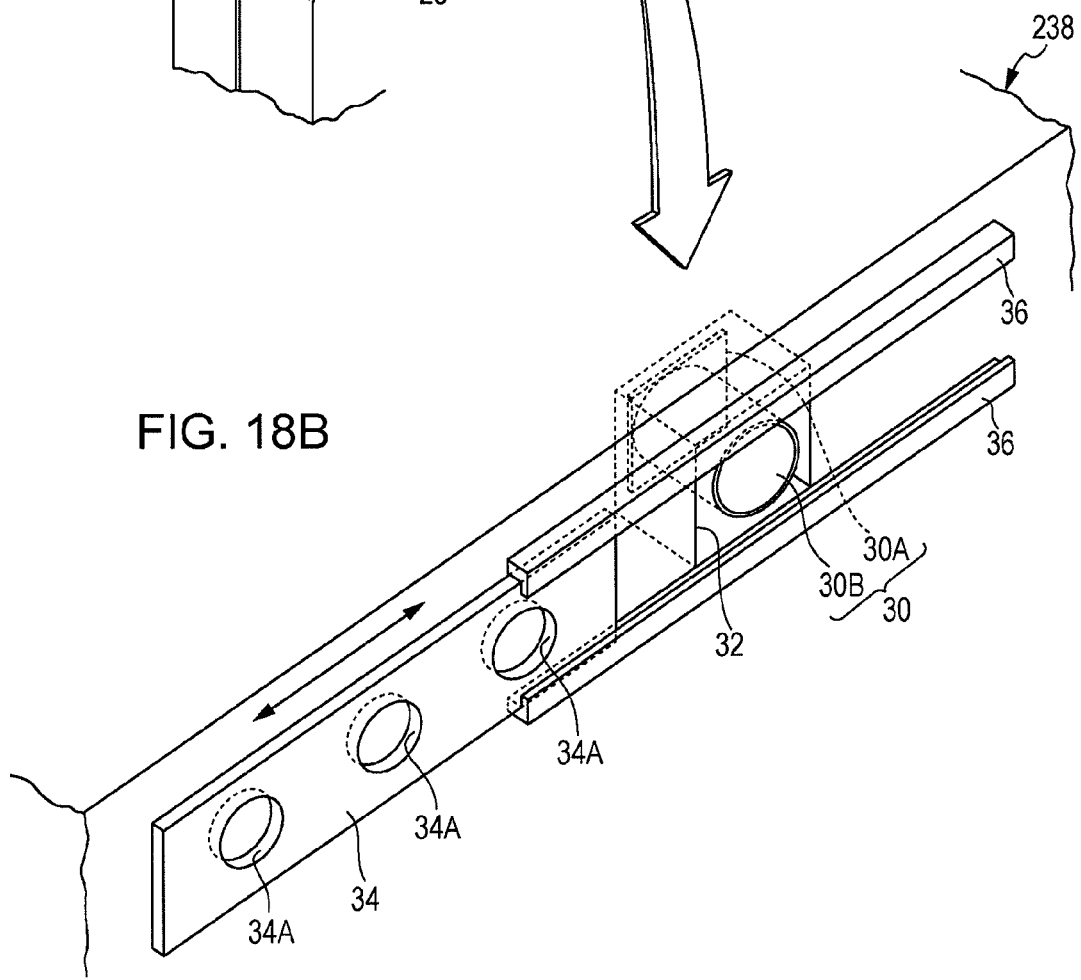
FIG. 18B is an enlarged perspective view of FIG. 18A.

As illustrated in FIG. 18B, the second human-presence sensor 30 includes a flat plate-shaped circuit board part 30A and a tubular detection part 30B. The end of the detection part 30B has a detection face. The circuit board part 30A is in contact with the bottom face of the groove 32, and is fixed. As a result, the detection face of the detection part 30B is positioned at an opening of the groove 32. Note that, in the present exemplary embodiment, the optical axis of the detection face of the detection part 30B is fixedly arranged so as to be perpendicular to the principal plane of the circuit board part 30A. However, for example, the detection part 30B may be attached so that the detection part 30B can swing with respect to the circuit board part 30A, whereby a configuration in which the optical axis of the detection face is changed without restriction may be used. In this case, the position of the maximum region M (see FIGS. 19B to 22B), which is described below, is changed without changing the size of the maximum region M. Note that examples of a scheme for changing the optical axis without restriction include a multi-axial structure, a ball-joint structure, and a flexible arm structure. The scheme is not particularly limited thereto.

Masks 34 are selectively disposed on the edge of the groove 32 so as to face the detection face of the detection part 30B of the second human-presence sensor 30. In each of the masks 34, openings 34A having different opening areas, different opening positions, and different opening shapes can be formed. In FIG. 18B, a mask 34 in which three openings 34A are formed is illustrated as an example, and the openings 34A have opening positions which are shifted from the attachment reference centers so that a circle corresponding to the detection face and the openings 34A are relatively eccentric. The detection region of the second human-presence sensor 30 is limited with respect to the maximum region M by attaching the mask 34 (see FIGS. 19B to 22B).

In the periphery of the groove 32, a pair of guiding members 36 are attached in parallel to each other in such a manner that each of the grooves 32 is oriented along a corresponding one of a pair of sides that face each other.

The guiding members 36 have a bar shape. The cross section thereof that is perpendicular to an axis thereof is formed so as to be substantially L-shaped. The guiding members 36 are attached so as to be bilaterally symmetric.

The mask 34 slides from ends of the guiding members 36 in the longitudinal direction by being guided by the pair of guiding members 36. Attachment reference centers (see alternate long and short dash lines in cross shapes illustrated in FIG. 18B) are set at three points on the mask 34. Positioning is performed on the mask 34 so that one of the attachment reference centers coincides with the optical axis of the detection face of the detection part 30B.

Note that, although depending on the state of the frictional resistance between the mask 34 and the guiding members 36 when the mask 34 slides, preferably, after the above-mentioned positioning is performed, the mask 34 is fixed on the periphery of the groove 32 using a commonly known detachable structure. As an example of the commonly known detachable structure, the mask 34 may be screwed into the periphery of the groove 32, be fastened with clips on the periphery of the groove 32, or be held using elastic force on the periphery of the groove 32.

Note that patterns of the masks 34 (see FIGS. 19A to 22B), which are described below, are set by classifying basic shapes of openings 34A on a shape-by-shape basis. However, masks may be prepared, in which individual shapes of openings are set in a complex manner (for example, a pattern in which an opening having a small area and having a shifted optical axis, an opening having an opening position shifted to the left and having a large opening area, and so forth are set).

Note that, for example, a mask 34 in which no opening exists may be prepared. A template with a pattern in which shapes of openings are set is made in accordance with a place in which the image processing apparatus 10 is disposed. On the basis of the template, the mask 34 may be processed in a site of placement of the image processing apparatus 10. Furthermore, the mask 34 may be processed without restriction and without using the template.

Furthermore, a control device provided with a program for which a region that a user desires to detect is input and which is used to perform arithmetic processing in order to calculate the most appropriate shape of an opening 34A may be mounted, or a serviceman may carry the control device.

The detection region of the second human-presence sensor 30 is limited with respect to the maximum region M by attaching each of the masks 34. Accordingly, in accordance with a place in which the image processing apparatus 10 is disposed, whether a user is approaching the image processing apparatus 10 for the sake of performing an operation on the image processing apparatus 10 or not for the sake of performing an operation on the image processing apparatus 10 is determined with a determination accuracy using the detection region that is limited with respect to the maximum region M. It is highly probable that the determination accuracy in this case is increased, compared with a determination accuracy with which whether a user is approaching the image processing apparatus 10 for the sake of performing an operation on the image processing apparatus 10 or not for the sake of performing an operation on the image processing apparatus 10 is determined using the maximum region M.

FIGS. 19A to 22B illustrate patterns, in which various shapes of openings 34A are set, of masks 34.

Figure 19A:
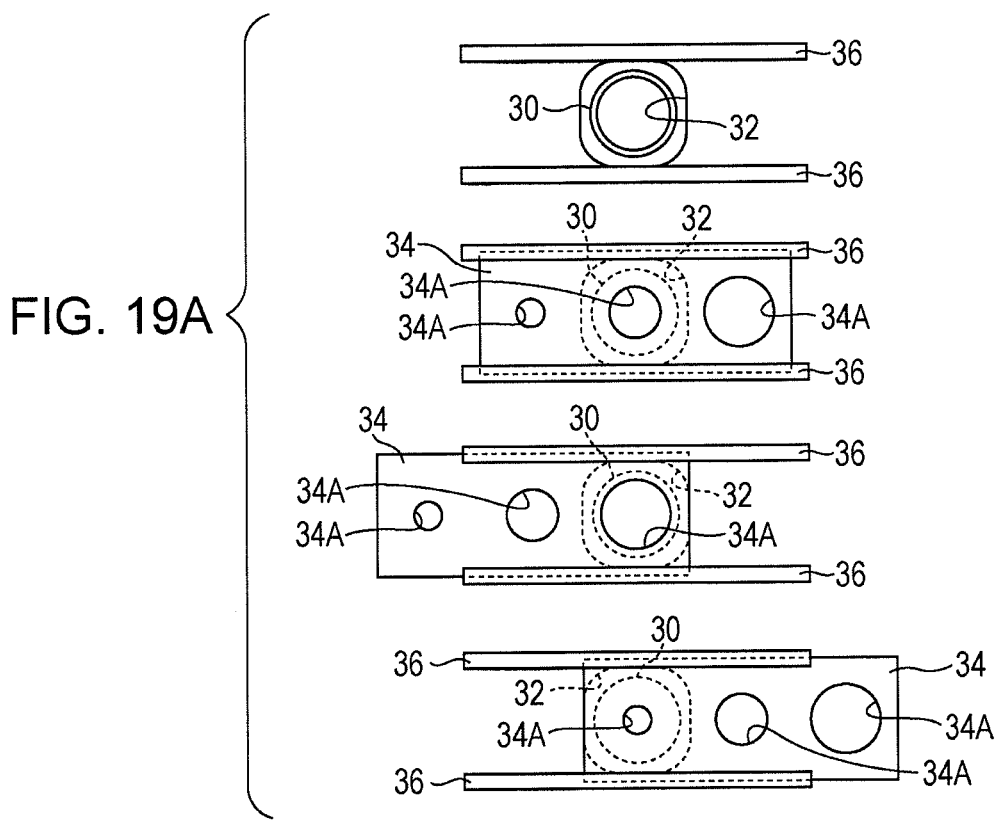
FIG. 19A illustrates a front view of a mask in which multiple openings having different opening areas are formed.
Figure 19B:
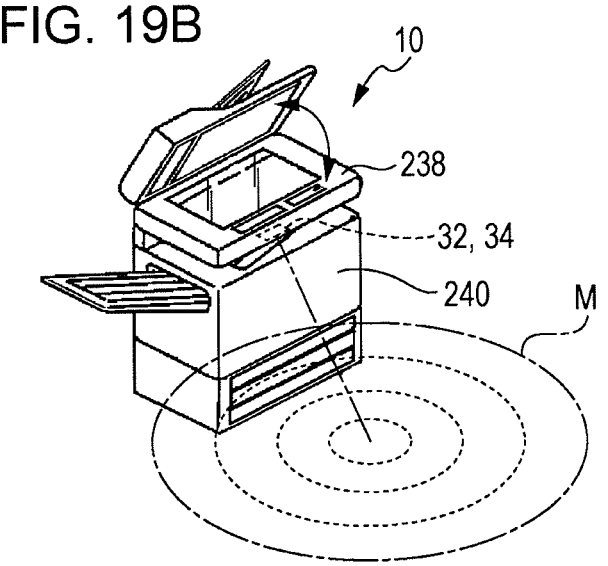
FIG. 19B illustrates a perspective view illustrating detection regions corresponding to the individual openings.

FIGS. 19A and 19B illustrate a pattern of a mask 34 in which openings 34A having different opening areas are formed. States illustrated from the top of FIG. 19A are as follows: a state in which the mask 34 is not attached; a state in which the detection face is masked by an opening 34A having a relatively median opening area; a state in which the detection face is masked by an opening 34A having a relatively large opening area; and a state in which the detection face is masked by an opening 34A having a relatively small opening area.

As illustrated in FIG. 19A, in the mask 34, openings 34A having different opening areas are formed as a pattern (in which the following openings 34A are set: an opening 34A having a relatively median opening area; an opening 34A having a relatively large opening area; and an opening 34A having a relatively small opening area). When the mask 34 is caused to slide along the pair of guiding members 36, detection regions, the shapes of which are coaxial circles having different radii, can be set as illustrated in FIG. 19B.

Accordingly, in a case in which a place in which the image processing apparatus 10 is disposed is a passage, a detection region is selected, by causing the mask 34 to slide, among the four types of detection regions including the maximum region M in accordance with the width of the passage or the like, and is set.

Figure 20A:
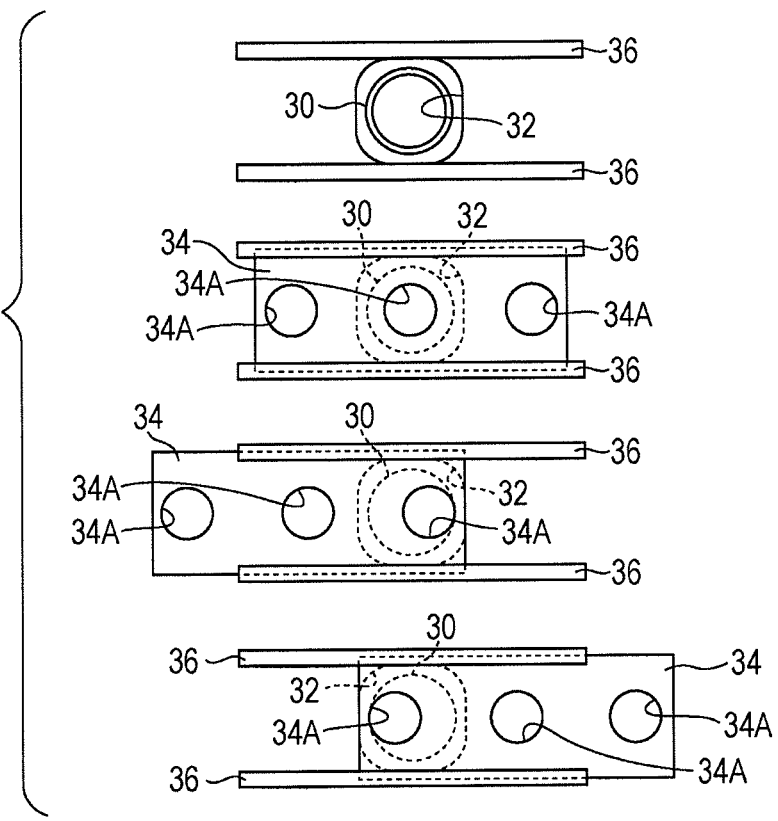
FIG. 20A illustrates a front view of a mask in which multiple openings having opening positions that are shifted to the left and right sides so that a circle corresponding to a detection face and the openings are relatively eccentric are formed.
Figure 20B:
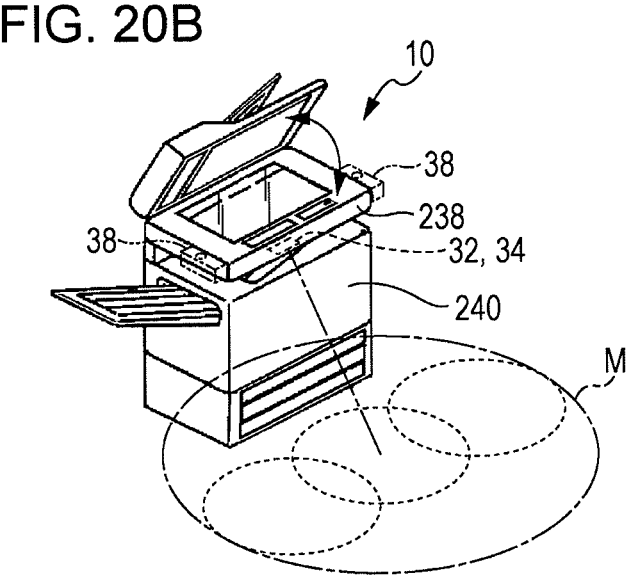
FIG. 20B illustrates a perspective view illustrating detection regions corresponding to the individual openings (in a case in which an integrated circuit (IC) card reader is attached)

FIGS. 20A and 20B illustrate a pattern of a mask 34 in which openings 34A having limited opening areas and having opening centers that are differently positioned so as to be shifted to the left and right sides are formed. States illustrated from the top of FIG. 20A are as follows: a state in which no mask 34 is attached; a state in which the detection face is masked by an opening 34A having an opening position that is not shifted from the attachment reference center so that the circle corresponding to the detection face and the opening 34A are not relatively eccentric; a state in which the detection face is masked by an opening 34A having an opening position that is relatively shifted from the attachment reference center to the left side so that the circle corresponding to the detection face and the opening 34A are relatively eccentric; and a state in which the detection face is masked by an opening 34A having an opening position that is shifted from the attachment reference center to the right side so that the circle corresponding to the detection face and the opening 34A are relatively eccentric.

As illustrated in FIG. 20A, in the mask 34, openings 34A having limited opening areas and having opening centers that are differently positioned so as to be shifted to the left and right sides are formed as a pattern (in which the following openings 34A are set: an opening 34A having an opening position that is not shifted from the attachment reference center so that the circle corresponding to the detection face and the opening 34A are not relatively eccentric; an opening 34A having an opening position that is relatively shifted from the attachment reference center to the left side so that the circle corresponding to the detection face and the opening 34A are relatively eccentric; and an opening 34A having an opening position that is shifted from the attachment reference center to the right side so that the circle corresponding to the detection face and the opening 34A are relatively eccentric). When the mask 34 is caused to slide along the pair of guiding members 36, three detection regions can be set along the width direction of the image processing apparatus 10 as illustrated in FIG. 20B.

Accordingly, for example, it is supposed that the IC card reader 38 used for an authentication process is disposed on either the left or right side of the image reading section 238 of the image processing apparatus 10, and that a first operation which is to be performed on the image processing apparatus 10 is necessarily the authentication process. In this case, the detection region may be set in accordance with a place (the right or left side of the image reading section 238) at which the IC card reader 38 is disposed.

Figure 21A:
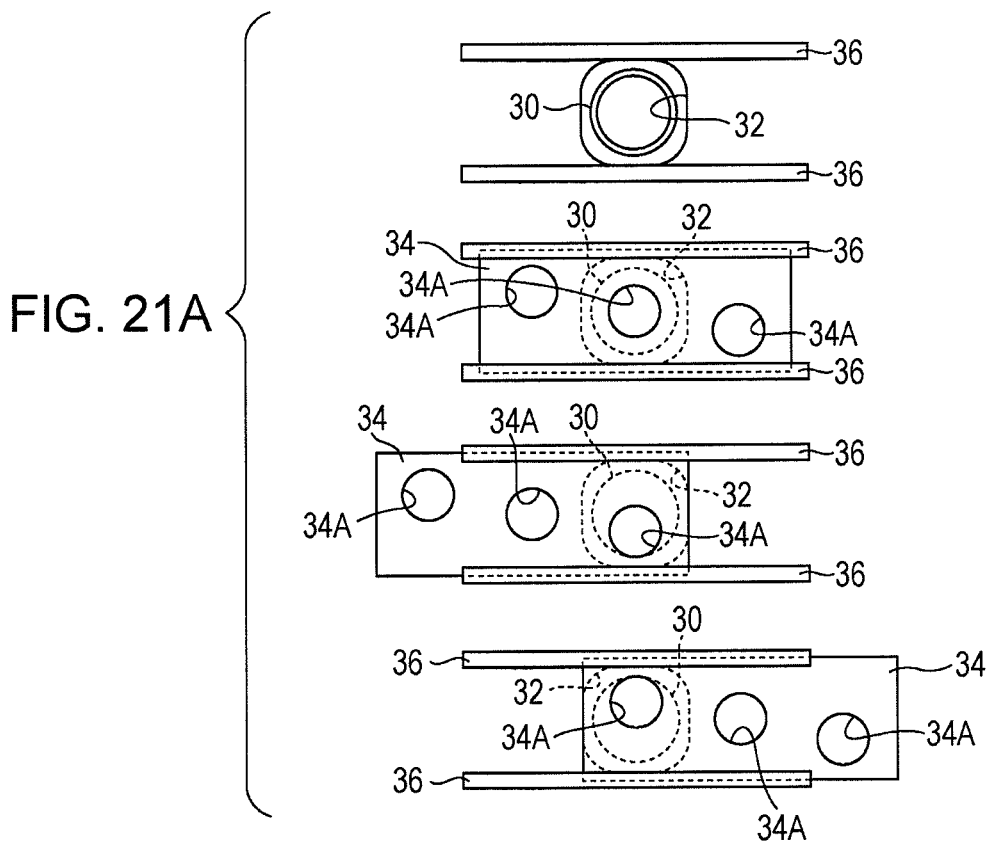
FIG. 21A illustrates a front view of a mask in which multiple openings having opening positions that are shifted in the depth direction so that the circle corresponding to the detection face and the openings are relatively eccentric are formed.
Figure 21B:
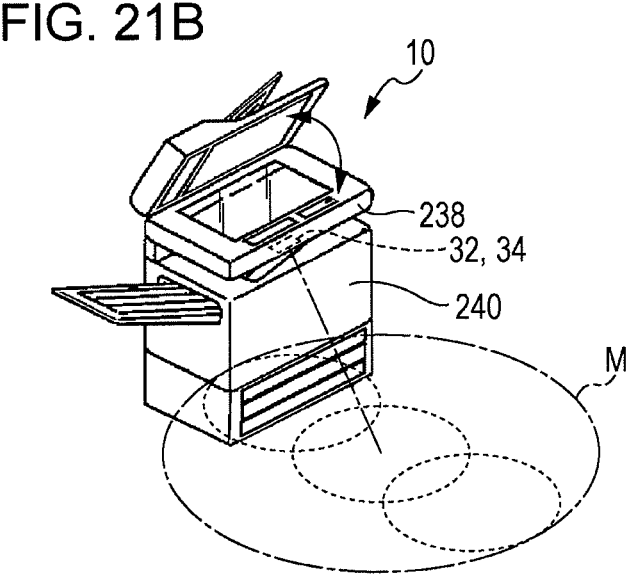
FIG. 21B illustrates a perspective view illustrating detection regions corresponding to the individual openings.

FIGS. 21A and 21B illustrate a pattern of a mask 34 in which openings 34A having limited opening areas and having opening centers that are differently positioned so as to be shifted to the front and rear sides. States illustrated from the top of FIG. 21A are as follows: a state in which no mask 34 is attached; a state in which the detection face is masked by an opening 34A having an opening position that is not shifted from the attachment reference center so that the circle corresponding to the detection face and the opening 34A are not relatively eccentric; a state in which the detection face is masked by an opening 34A having an opening position that is relatively shifted from the attachment reference center to the front side so that the circle corresponding to the detection face and the opening 34A are relatively eccentric; and a state in which the detection face is masked by an opening 34A having an opening position that is shifted from the attachment reference center to the rear side so that the circle corresponding to the detection face and the opening 34A are relatively eccentric.

As illustrated in FIG. 21A, in the mask 34, openings 34A having limited opening areas and having opening centers that are differently positioned so as to be shifted to the front and rear sides are formed as a pattern (in which the following openings 34A are set: an opening 34A having an opening position that is not shifted from the attachment reference center so that the circle corresponding to the detection face and the opening 34A are not relatively eccentric; an opening 34A having an opening position that is relatively shifted from the attachment reference center to the front side so that the circle corresponding to the detection face and the opening 34A are relatively eccentric; and an opening 34A having an opening position that is shifted from the attachment reference center to the rear side so that the circle corresponding to the detection face and the opening 34A are relatively eccentric). When the mask 34 is caused to slide along the pair of guiding members 36, three detection regions can be set along the depth direction of the image processing apparatus 10 as illustrated in FIG. 21B.

Accordingly, for example, it is supposed that the image processing apparatus 10 is disposed along columns or in a recessed place, and that a person who intends to perform an operation on the image processing apparatus 10 approaches the image processing apparatus 10 from the front of the image processing apparatus 10. In this case, by causing the mask 34 to slide in a direction of a passage along which the person approaches the image processing apparatus 10, a detection region is selected among the three types of detection regions, and is set.

Note that, in FIGS. 19A to 21B, the openings 34A have circular shapes. However, the shapes of the openings 34A are not limited thereto. Examples of the shapes of the openings 34A include rectangular shapes, polygonal shapes, elliptic shapes, and star shapes. Furthermore, two or more openings may be formed at one type of position in a mask.

Figure 22A:
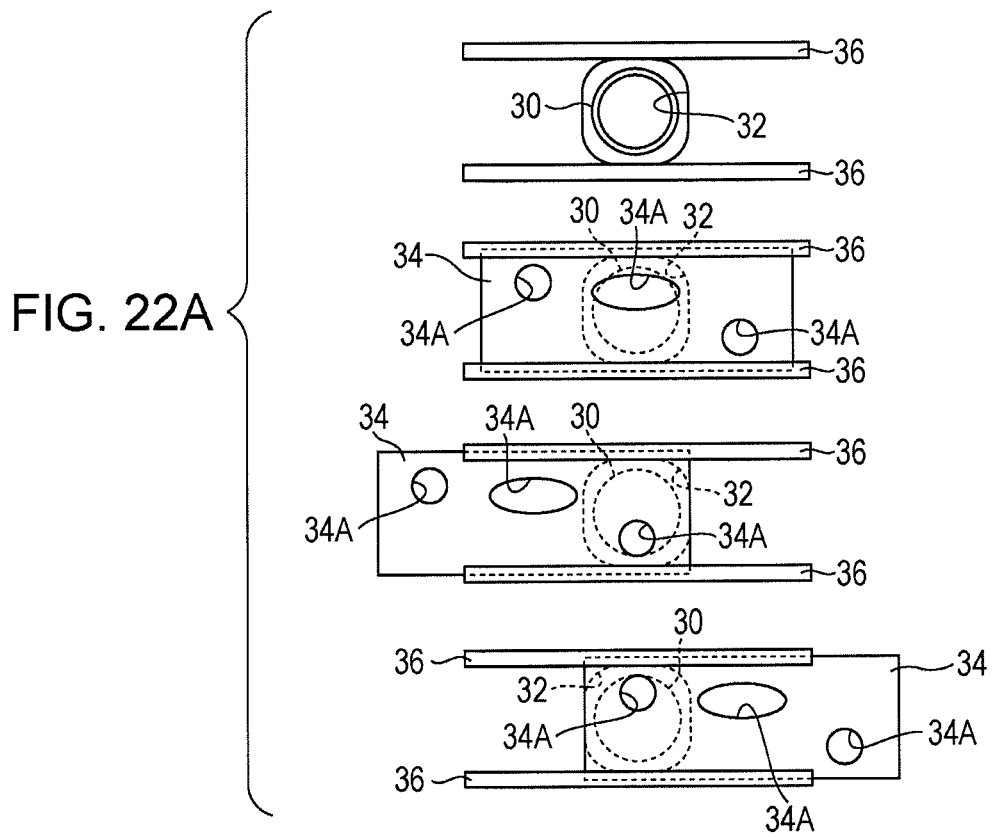
FIG. 22A illustrates a front view of a mask in which multiple openings having different opening positions, different opening shapes, different opening areas, and so forth are formed without restriction.
Figure 22B:
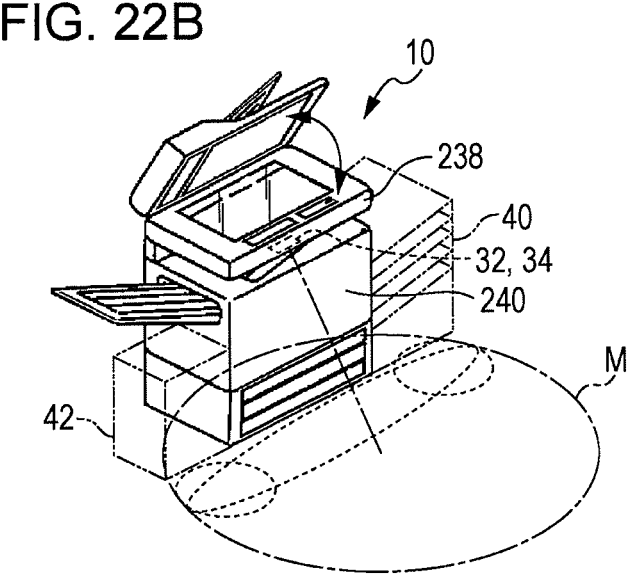
FIG. 22B illustrates a perspective view illustrating detection regions corresponding to the individual openings (in a case in which an optional device is attached)

FIGS. 22A and 22B illustrate a pattern of a mask 34 in which openings 34A are formed without restriction. States illustrated from the top of FIG. 22A are as follows: a state in which no mask 34 is attached; a state in which the detection face is masked by an opening 34A having a flat shape; a state in which the detection face is masked by an opening 34A corresponding to a pinpoint relatively positioned on the left side of an apparatus; and a state in which the detection face is masked by an opening 34A corresponding to a pinpoint relatively positioned on the right side of an apparatus.

As illustrated in FIG. 22A, in the mask 34, openings 34A are formed without restriction as a pattern (in which the following openings 34A are set: an opening 34A having a flat shape; an opening 34A corresponding to a pinpoint relatively positioned on the left side of an apparatus; and an opening 34A corresponding to a pinpoint relatively positioned on the right side of an apparatus). When the mask 34 is caused to slide along the pair of guiding members 36, three detection regions can be set in accordance with a place in which the image processing apparatus 10 is disposed or a state in which an optional device is attached to the image processing apparatus 10 as illustrated in FIG. 22B.

For example, when the opening 34A having a flat shape is used, it is supposed that the image processing apparatus 10 is disposed in a narrow passage in a state in which an optional device (the automatic sorting device 40 or the large-capacity sheet storage device 42) is attached to the left or right side of the image processing apparatus 10. In this case, the length of the detection region in the depth direction is set to be short in the front of the entirety of the image processing apparatus 10 including the optional device. Accordingly, a person passing on a side, which is opposite a side on which the image processing apparatus 10 is disposed, of the passage is not detected, and a person approaching the image processing apparatus 10 is detected. Note that, in this case, for example, when a person approaches the image processing apparatus 10 in order to supply sheets to the large-capacity sheet storage device 42 serving as the optional device, in order to cause the second human-presence sensor 30 to detect the person, it is only necessary that the person reach the front of the large-capacity sheet storage device 42. A sheet supply state is recognized by the main controller 200 to which power is supplied again.

Note that, in the present exemplary embodiment, a configuration is used, in which an opening 34A is selected by causing the mask 34 to slide along the guiding member 36 for the second human-presence sensor 30 that is fixed. However, a configuration may be used, in which openings 34A or multiple detection-face limiting parts that are equivalent thereto are formed in advance in the image processing apparatus 10, in which one or multiple detection-face limiting parts are selected among the detection-face limiting parts, and in which one or multiple second human-presence sensors 30 are attached.

Furthermore, movement of the masks 34 is not limited to linear sliding. As a matter of course, a configuration in which the masks 34 are replaced one by one may be used. For example, a so-called turret system may be used, in which multiple openings 34A are formed on the edge of a disc, and in which an opening 34A is selected by causing the mask 34 to rotate. Furthermore, the second human-presence sensor 30 may be supported on a stand capable of being three-dimensionally moved, and the degree of flexibility of adjustment of the optical axis of the detection face may be increased.

Moreover, a state in which the second human-presence sensor 30 is attached, and in which the possibility of determination of a user approaching the image processing apparatus 10 for the sake of using the image processing apparatus 10 is high may be determined on the basis of detection-history information concerning the detection history of bodies capable of movement detected by the second human-presence sensor 30. Furthermore, in a case in which adequate power is ensured in a mode state that is a power-supply state or the power saving mode, a configuration may be used, in which the detection direction of the second human-presence sensor 30 or movement of a mask 34 for the sake of selecting an opening 34A can be automatically adjusted using a drive source, such as a motor, on the basis of the detection-history information.

Additional Second Requirement "Sensitivity of Sensors"

Each of the first human-presence sensor 28 and the second human-presence sensor 30 used in the present exemplary embodiment has a sensitivity with which a body capable of movement is detected.

For example, in the image processing apparatus 10, a timer is activated at a point in time when image processing finishes. After a predetermined time elapses, the operation state of the image processing apparatus 10 is shifted to the sleep mode. It is detected by the first human-presence sensor 28 and the second human-presence sensor 30 that a person enters the detection regions located in the periphery of the image processing apparatus 10. Accordingly, the operation state of the image processing apparatus 10 is shifted to the warm-up mode or the like.

Regarding shifting to the sleep mode, the earlier relatively the operation state of the image processing apparatus 10 is shifted to the sleep mode (the shorter the time measured by the timer until the operation state of the image processing apparatus 10 is shifted to the power-saving state), the higher the "energy saving performance". In contrast, in a case of shifting to a mode state that is a power-supply state, such as the warm-up mode, the earlier relatively the operation state of the image processing apparatus 10 is shifted to a mode state that is a power-supply state (the higher the sensitivity of the first human-presence sensor 28 and the second human-presence sensor 30), the higher the "convenience". There is a trade-off between the "energy saving performance" and the "convenience".

Figure 23:
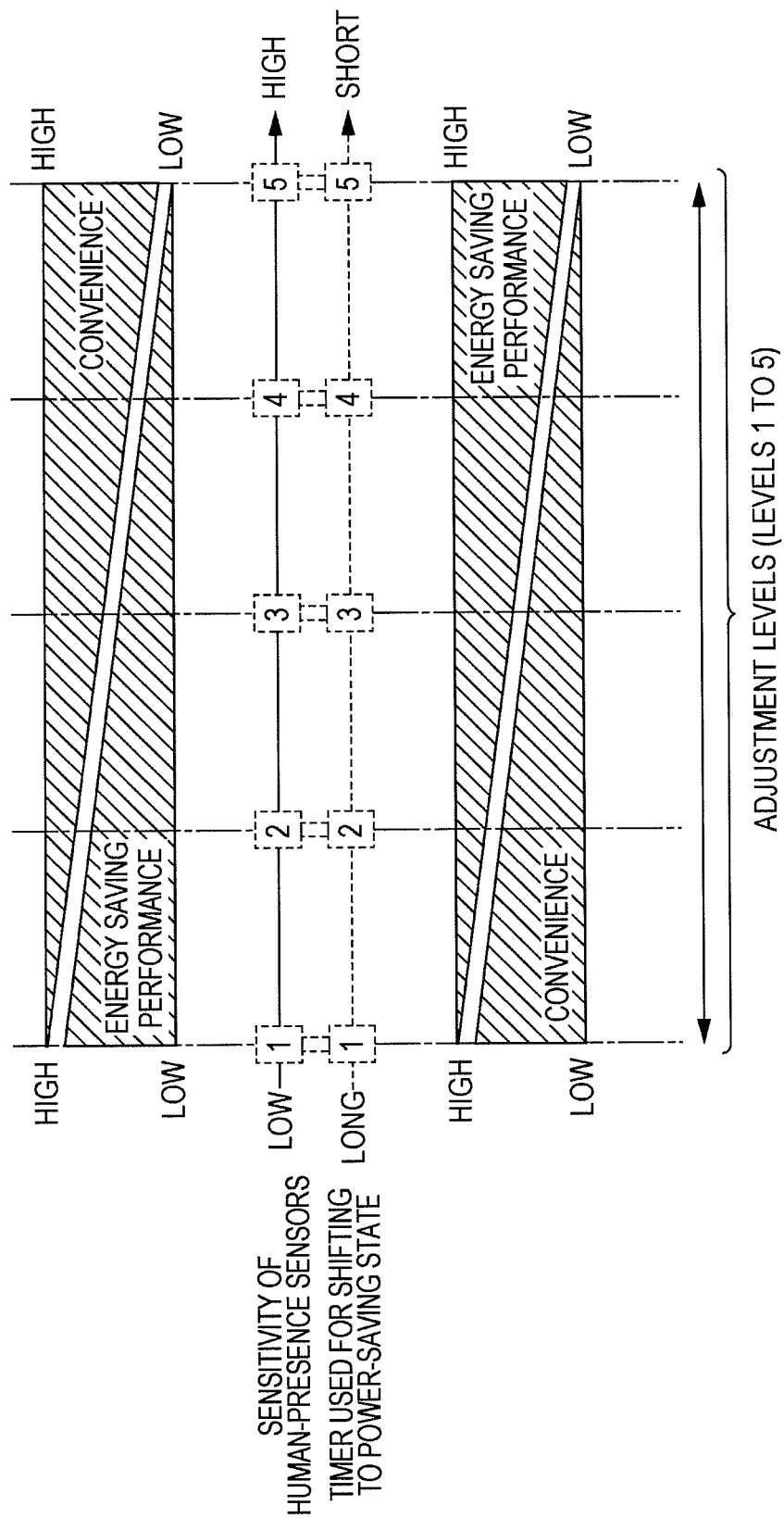
FIG. 23 is a schematic diagram illustrating adjustment levels of the sensitivity of the human-presence sensors and the count value of a timer used for shifting to a power-saving state in order to achieve both energy saving performance and convenience of the image processing apparatus according to the present exemplary embodiment.

For this reason, as illustrated in FIG. 23, in order to achieve equilibrium between the "energy saving performance" and the "convenience", indicators with which the degrees of effects of the "energy saving performance" and the "convenience" are set in a step-by-step manner are established.

In other words, in the main controller 200 (which includes the during-power-saving monitoring control section 24) of the image processing apparatus 10, a level (in FIG. 23, levels 1 to 5 are set) is determined in accordance with the indicators on the basis of a usage state of the image processing apparatus 10. Control is performed in order to achieve both the "energy saving performance" and the "convenience".

In a case of performing control of setting a level of the sensitivity of the first human-presence sensor 28 and the second human-presence sensor 30 and a level of the count value of a timer used for shifting to a power-saving state, control is performed so as to change the sensitivity of the first human-presence sensor 28 and the second human-presence sensor 30 in association with a change in the level of the count value of the timer (see indicators for the levels 1 to 5 illustrated in FIG. 23).

For example, as the count value of the timer increases, the convenience increases, but the energy saving performance decreases. For this reason, the sensitivity of the first human-presence sensor 28 and the second human-presence sensor 30 is reduced, whereby compensation is made for a decrease in the energy saving performance although the convenience is sacrificed.

In contrast, as the count value of the timer decreases, the energy saving performance increases, but the convenience decreases. For this reason, the sensitivity of the first human-presence sensor 28 and the second human-presence sensor 30 is increased, whereby compensation is made for a decrease in the convenience although the energy saving performance is sacrificed.

Furthermore, in contrast, in the case of performing control of setting a level of the sensitivity of the first human-presence sensor 28 and the second human-presence sensor 30 and a level of the count value of the timer, control is performed so as to change the level of the count value of the timer in association with a change in the sensitivity of the first human-presence sensor 28 and the second human-presence sensor 30 (see indicators for the levels 1 to 5 illustrated in FIG. 23). For example, as the sensitivity of the first human-presence sensor 28 and the second human-presence sensor 30 decreases, the energy saving performance increases, but the convenience decreases. For this reason, the count value of the timer is increased, whereby compensation is made for a decrease in the convenience although the energy saving performance is sacrificed. In contrast, as the sensitivity of the first human-presence sensor 28 and the second human-presence sensor 30 increases, the convenience increases, but the energy saving performance decreases. For this reason, the count value of the timer is reduced, whereby compensation is made for a decrease in the energy saving performance although the convenience is sacrificed.

Additional Third Requirement "Fail-Safe for Human-Presence Sensors"

In the present exemplary embodiment, in addition to the basic functions described above, multiple human-presence sensors (the one first (pyroelectric) human-presence sensor 28 and the one second (reflection-type) human-presence sensor 30) are used, thereby providing a fail-safe function for the multiple human-presence sensors. In other words, when outputting of a signal is interrupted or an abnormal signal is output because one of the human-presence sensors malfunctions, the other human-presence sensors compensate for the malfunction.

As a matter of course, when the number of human-presence sensors having the same function (pyroelectric or reflection-type) is two or more, the detection regions thereof may be adjusted. However, as in the present exemplary embodiment, when there are human-presence sensors having functions different from each other and the number of human-presence sensors is one for each of the functions, it is necessary to change a manner for monitoring control.

Here, when the first human-presence sensor 28 (a pyroelectric sensor) is no longer usable, only the second human-presence sensor 30 (a reflection-type sensor) monitors a body capable of movement during the entire sleep mode. Whether or not a body capable of movement (a user) exists is determined only on the basis of an on/off signal of the second human-presence sensor 30. Although, as a result, the determination accuracy decreases and an opportunity for cycle-up is delayed, if a setting for providing a notification of an abnormality is also set, the second human-presence sensor 30 is able to sufficiently deal with this situation as an emergency measure until a service man or the like arrives.

In contrast, when the second human-presence sensor 30 (a reflection-type sensor) is no longer usable, monitoring using only the first human-presence sensor 28 is performed. In this situation, because of the characteristics (specification) of the first human-presence sensor 28, the first human-presence sensor 28 is not able to deal with an act of a user, such as an act of standing still in front of the image processing apparatus 10. Accordingly, the determination accuracy further decreases, and, in contrast, the frequency of unnecessary cycle-up increases, compared with those in a case of monitoring using the second human-presence sensor 30 alone.

For this reason, a monitoring system using only the first human-presence sensor 28 (a pyroelectric sensor) is established. Note that, in the present exemplary embodiment, although the monitoring system using only the first human-presence sensor 28 (a pyroelectric sensor) is provided as a fail-safe function, the monitoring system may also be applied to an image processing apparatus originally having a specification in which monitoring using only a pyroelectric sensor is performed.

Hereinafter, a sleep-mode monitoring control routine using the first human-presence sensor 28 alone in a case in which the second human-presence sensor 30 malfunctions will be described with reference to a flowchart of FIG. 24. Note that, regarding diagnosis of malfunction of the first human-presence sensor 28 and the second human-presence sensor 30, because a commonly known sensor malfunction diagnosis system may be used, a detailed description thereof is omitted here.

Figure 24:
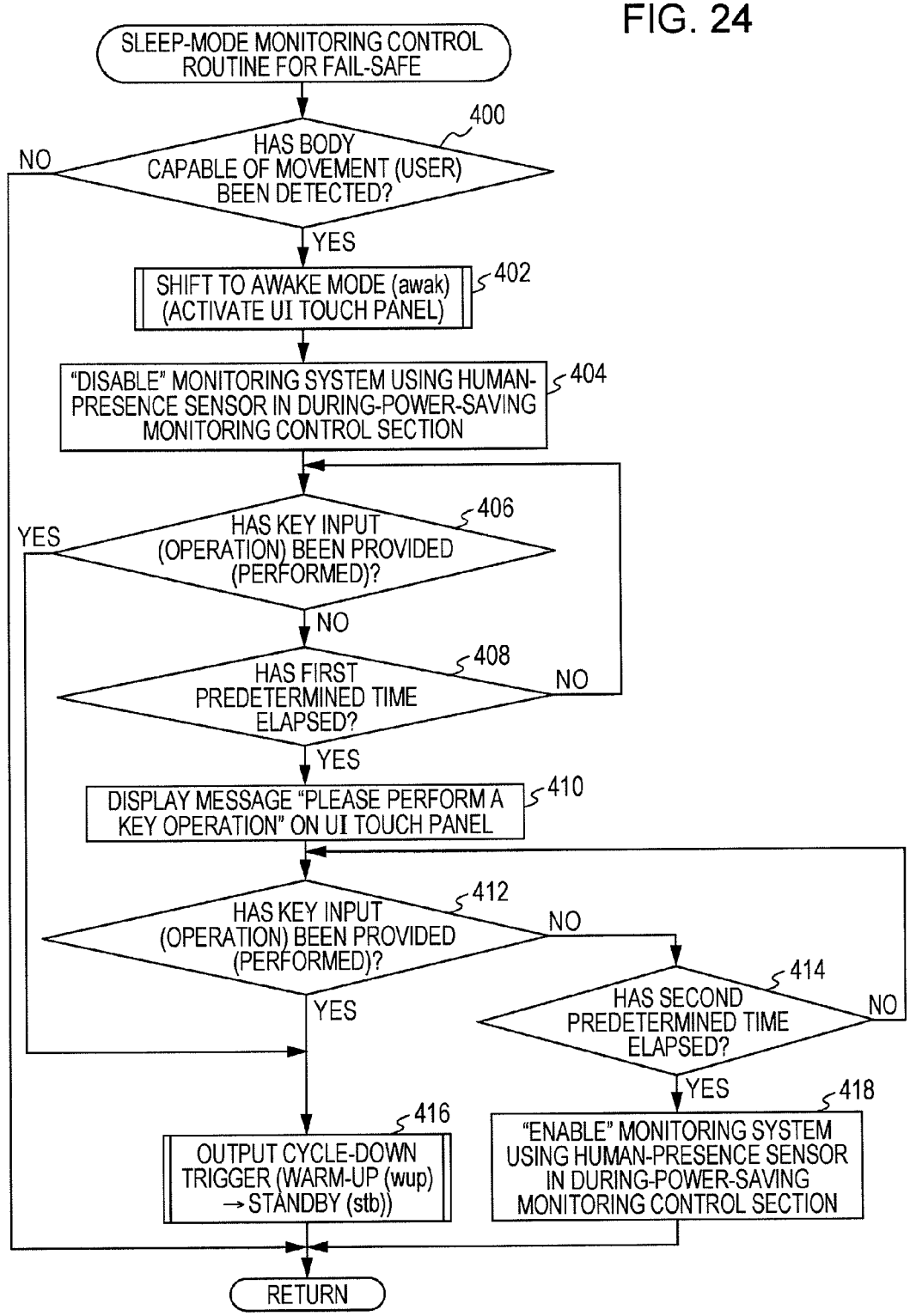
FIG. 24 is a flowchart illustrating a sleep-mode monitoring control routine using the first human-presence sensor alone in a case in which the second human-presence sensor malfunctions.

As illustrated in FIG. 24, in step 400, whether or not a body capable of movement (a user) has been detected by the first human-presence sensor 28 is determined. When a result of determination is NO, the sleep-mode monitoring control routine finishes. Note that, because other processing is basically not performed during the sleep mode, the flow immediately returns to step 400.

When a result of determination in step 400 is YES, the flow proceeds to step 402, and the operation state of the image processing apparatus 10 is shifted from the sleep mode (slp) to the awake mode (awk), which are illustrated in FIG. 5. In other words, this state is a state in which, although the image processing apparatus 10 is basically still in the sleep mode, power is supplied to the UI touch panel 216 so that the UI touch panel 216 is activated.

In step 404 that is the next step, a monitoring system using the first human-presence sensor 28 is "disabled" in the during-power-saving monitoring control section 24, and the flow proceeds to step 406. The reason for this is that, for example, when the user stands still in front of the image processing apparatus 10, because a signal is no longer output from the first human-presence sensor 28, there is a high probability that it is determined that the user has moved away from the image processing apparatus 10.

In step 406, whether or not a key input (operation) using the UI touch panel 216 has been provided (performed) is determined. When a result of determination is NO, the flow proceeds to step 408, and whether or not a first predetermined time that is set in advance has elapsed is determined. When a result of determination in step 408 is NO, the flow returns to step 406, and steps 406 and 408 are repeatedly performed.

While steps 406 and 408 given above are repeatedly being performed, when a result of determination in step 406 is YES, i.e., when it is determined that a key input (operation) has been provided (performed), the flow proceeds to step 416 (which is described below).

Furthermore, when a result of determination in step 408 is YES, i.e., in a case in which it is determined that a key input (operation) has not been provided (performed) even when the first predetermined time had elapsed, the flow proceeds to step 410. A message (for example, saying that "Please perform a key operation") is displayed on the UI touch panel 216. The flow proceeds to step 412.

Accordingly, if a user exists in front of the image processing apparatus 10, the message can serve as an opportunity for promptly performing a key operation. Note that the contents of the massage are not limited to the contents given above, and any message prompting a user to perform a key operation may be used. A user may be notified through the five senses (for example, the sense of hearing or the sense of touch) not including the sense of sight.

In step 412 that is the next step, whether or not a key input (operation) using the UI touch panel 216 has been provided (performed) is determined. When a result of determination is NO, the flow proceeds to step 414, and whether or not a second predetermined time that is set in advance has elapsed is determined. When a result of determination in step 414 is NO, the flow returns to step 412, and steps 412 and 414 are repeatedly performed.

Note that there is no correlation between the first predetermined time and the second predetermined time. However, the first predetermined time and the second predetermined time may be set in accordance with a purpose. For example, regarding the first predetermined time, because there is a highly probability that a body capable of movement (a user) is approaching, the first predetermined time is set to be comparatively long. Regarding the second predetermined time, because it is expected that a user will perform an operation immediately after the user looks at the message, the second predetermined time is set to be comparatively short.

While steps 412 and 414 given above are repeatedly being performed, when a result of determination in step 414 is YES, i.e., when it is determined that a key input (operation) has been provided (performed), the flow proceeds to step 416. In step 416, the cycle-down trigger is output, and the sleep-mode monitoring control routine ends. Accordingly, the operation state of the image processing apparatus 10 is shifted to the warm-up mode (wup). When warm-up is completed, the operation state of the image processing apparatus 10 is shifted to the standby mode (stb).

Furthermore, when a result of determination in step 414 is YES, i.e., in a case in which it is determined that a key input (operation) has not been provided (performed) even when the second predetermined time has elapsed, the flow proceeds to step 418. The monitoring system using the first human-presence sensor 28 is "enabled" in the during-power-saving monitoring control section 24, and the sleep-mode monitoring control routine ends.

Selection of Human-Presence Sensors on Mode-State-by-Mode-State Basis (Patterns of Supply of Power)

Figure 25:
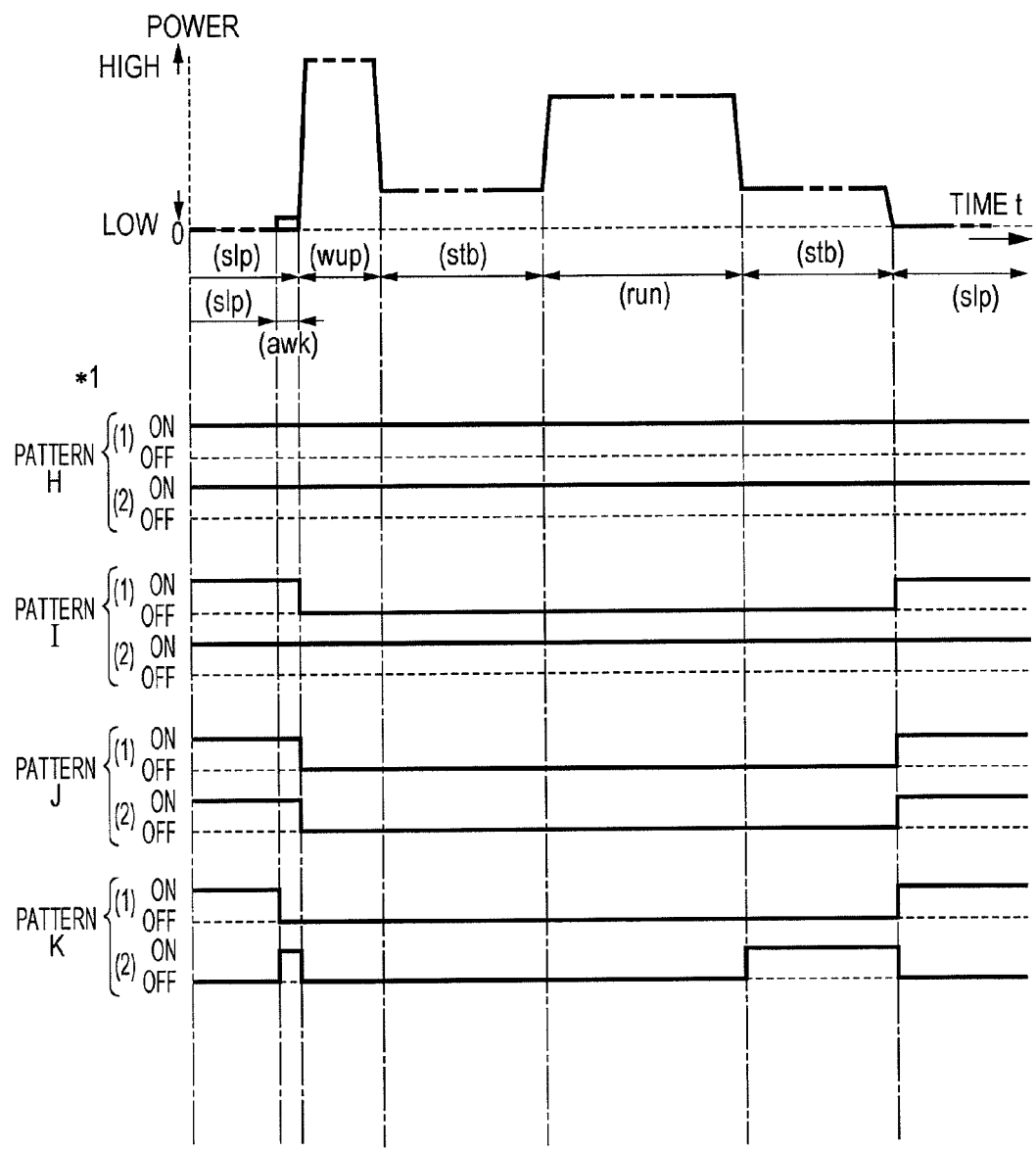
FIG. 25 is a timing chart illustrating examples of patterns of supply or non-supply of power to the first human-presence sensor and the second human-presence sensor on a mode-state-by-mode-state basis in the image processing apparatus.

FIG. 25 illustrates patterns H to K as examples of patterns of selection, on a mode-state-by-mode-state basis, of whether or not power is to be supplied to the first human-presence sensor 28 (denoted by "(1)" in FIG. 25) and the second human-presence sensor 30 (denoted by "(2)" in FIG. 25) (whether the first human-presence sensor 28 and the second human-presence sensor 30 are to be turned "ON" or "OFF").

The pattern H is a pattern indicating that the first human-presence sensor 28 and the second human-presence sensor 30 are always in an ON (power-supply) state. The pattern H is used for a case in which a highest priority is assigned to the convenience.

The pattern I is a pattern indicating that the first human-presence sensor 28 is an OFF (non-power-supply) state except during the sleep mode. If it is recognized that a user stands up in front of the image processing apparatus 10, it is unnecessary to perform detection so as to cover a distant region (for example, the first region F illustrated in FIG. 6).

The pattern J is a pattern indicating that both the first human-presence sensor 28 and the second human-presence sensor 30 are in the OFF (non-power-supply) state except during the sleep mode. After it is recognized that a user stands up in front of the image processing apparatus 10, a mode state to which the operation state of the image processing apparatus 10 is to be shifted thereafter may be determined in accordance with whether or not an input operation using the UI touch panel 216 or the like is performed or may be determined using a timer.

The pattern K is a pattern indicating that, when the awake mode is set, the first human-presence sensor 28 enters the OFF (non-power-supply) state before the second human-presence sensor 30 enters the OFF (non-power-supply) state, and is a pattern indicating that, in the standby mode after the running mode, the second human-presence sensor 30 enters the ON (power-supply) state before the first human-presence sensor 28 enters the ON (power-supply) state.

Note that, regarding the patterns of supply of power, the above-described patterns H to K are some of combinations of the individual mode states. Various combinations are considered in accordance with whether a highest propriety is assigned to a reduction of power consumption or to the convenience. In the present exemplary embodiment, the combinations of the individual mode states are not limited. In other words, whether or not power is to be supplied can be selected for each of the first human-presence sensor 28 and the second human-presence sensor 30 on a mode-state-by-mode-state basis.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power-supply control device comprising:

a power-supply-state transition control section that shifts a state of an operation target section from one state to another state among a plurality of power-supply states and a non-power supply-state, the operation target section being a section which operates by receiving supply of power from a mains power source section, each of the plurality of power-supply states being a state having a power consumption which is a corresponding one of power consumptions that are different from one another, the non-power-supply state being a state in which supply of power is not received from the mains power source section or a state in which supply of power that is lower than power determined in advance and that is necessary for control of determining whether or not power is to be supplied is received from the mains power source section;

a plurality of body-detection sections that detect a body in a region which is set in advance, each of the plurality of body detection sections having a corresponding one of detection conditions different from one another, the body including a user who intends to use the operation target section, one of the plurality of body-detection sections continuously receiving supply of power as a section used for determination control in the non-power-supply state, another one of the plurality of body-detection sections receiving supply of power as the section used for determination control in response to when the body is detected by the body-detection section that continuously receives supply of power in the non-power-supply state; and an instruction section that provides, on the basis of a detection state, an instruction for shifting the state of the operating target section from one state to another state which the power-supply-state transition control section the detection section that receives supply of power in response to when the body is detected by the body-detection section that continuously receives supply of power in the non-power-supply state, wherein when a body is not detected but a job of an operating target section is still executing determining a type of job being performed and placing one or more unused operating target section, based on the type of job being performed, in a non-power-supply state, and when a predetermined amount of time has passed since old jobs have finished executing placing all operating target sections of the multi-functional printer into a non-power-supply state.

2. The power-supply control device according to claim 1, wherein, when one of the plurality of body-detection sections detects the body, the instruction section provides an instruction for shifting from the non-power-supply state to one of the plurality of power-supply states, and, while another one of the plurality of body-detection sections is detecting the body, the instruction section provides an instruction for maintaining the power-supply state.

3. A power-supply control device comprising:
a power-supply state transition control section that shifts a state of an operation target section from one state to another state among a plurality of power-supply states and a non-power-supply state, the operation target section being a section which operates by receiving supply of power from a mains power source section, each of the plurality of power-supply states being a state having a power consumption which is a corresponding one of power consumptions that are different from one another, the non-power-supply state being a state in which supply of power is not received from the mains power source section or a state in which supply of power that is lower than power determined in advance and that is necessary for control of determining whether or not power is to be supplied is received from the mains power source section;
a plurality of body detecting sections including a user who intends to use the operation target section, one of the plurality of body-detection sections detecting a body in a region which is set in advance and which is relatively large and continuously receiving supply of power as a section used for determination control in the non-power-supply state, another one of the plurality of body-detection control in the non-power-supply state, another one of plurality of body-detection sections detecting the body in a region which is set in advance, which is relatively small, and which is close to the operation target section, and receiving supply of power as the section used for determination control in response to when the body is detected by the body-detection section that continuously receives supply of power in the non-power-supply state;
an instruction section that provides, on the basis of a transition condition, an instruction for shifting between the non-power-supply state and one of the plurality of power-supply states, the transition condition being a condition which includes results of detection performed by the plurality of body-detection sections and which is determined in advance; and
a state maintaining section that maintains, for an instruction for shifting from one of the plurality of power-supply states to the non-power-supply state, the power-supply state until the body is no longer detected by the body-detection section which receives supply of power at the point in time when the body is detected by the body-detection section that continuously receives supply of power, the instruction being an instruction which has been provided by the instruction section because the transition condition has been established, wherein when a body is not detected but a job of an operating target section is still executing determining a type of job being performed and placing one or more unused operating target section, based on the type of job being performed, in a non-power-supply state, and when a predetermined amount of time has passed since old jobs have finished executing placing all operating target sections of the multi-functional into a non-power-supply state.

4. The power-supply control device according to claim 3, wherein the transition condition that is established when the state of the operation target section is shifted from the power-supply state to the non-power-supply state is a condition where measurement of a time starts from a point in time when the operation target section enters an operable state or from a point in time when an operation of the operation target section finishes and the measured time exceeds a transition time that is determined in advance.

5. The power-supply control device according to claim 1, wherein the detection conditions of the plurality of body-detection sections are detection regions in which the body is detectable, and the detection region of one of the plurality of body-detection sections includes the detection region of another one of the plurality of body-detection sections.

6. The power-supply control device according to claim 3, wherein the detection conditions of the plurality of body-detection sections are detection regions in which the body is detectable, and the detection region of one of the plurality of body-detection sections includes the detection region of another one of the plurality of body-detection sections.

7. The power-supply control device according to claim 1, wherein the detection conditions of the plurality of body-detection sections are detection distances within which the body is detectable, and the detection distance of one of the plurality of body-detection sections is longer than the detection distance of another one of the plurality of body-detection sections.

8. The power-supply control device according to claim 3, wherein the detection conditions of the plurality of body-detection sections are detection distances within which the body is detectable, and the detection distance of one of the plurality of body-detection sections is longer than the detection distance of another one of the plurality of body-detection sections.

9. The power-supply control device according to claim 1, wherein one of the plurality of body-detection sections is a pyroelectric sensor, and another one of the plurality of body-detection sections is a reflection-type sensor.

10. The power-supply control device according to claim 1, wherein the non-power-supply state includes a sleep mode, and the plurality of power-supply states include a warm-up mode, a standby mode, and a running mode, the sleep mode being a mode in which power is supplied only to a control system associated with the plurality of body-detection sections, the warm-up mode being a mode that is provided at a preparatory stage at which preparation for activation of the operation target section from the sleep mode is made, the standby mode being a mode in which power lower than power that is in a steady state is supplied to the operation target section, the running mode being a mode in which power that is in the steady state is supplied to the operation target section, and wherein a cycle-up instruction for shifting from the sleep mode to the warm-up mode, a key input instruction for shifting from the standby mode to the running mode, a job execution instruction for starting an operation in the running mode, and a cycle-down instruction for shifting from the standby mode to the sleep mode are selectively provided for the power-supply-state transition control section as instructions, which are provided by the instruction section, for shifting from one mode to another mode among the sleep mode, the warm-up mode, the standby mode, and the running mode.

11. The power-supply control device according to claim 1, wherein the non-power-supply state includes a sleep mode, and the plurality of power-supply states include a warm-up mode, a standby mode, and a running mode, the sleep mode being a mode in which power is supplied only to a control system associated with the plurality of body-detection sections, the warm-up mode being a mode that is provided at a preparatory stage at which preparation for activation of the operation target section from the sleep mode is made, the standby mode being a mode in which power lower than power that is in a steady state is supplied to the operation target section, the running mode being a mode in which power that is in the steady state is supplied to the operation target section, and wherein a cycle-up instruction for shifting from the sleep mode to the warm-up mode, a key input instruction for shifting from the standby mode to the running mode, a job execution instruction for starting an operation in the running mode, and a cycle-down instruction for shifting from the standby mode to the sleep mode are selectively provided for the power-supply-state transition control section as instructions, which are provided by the instruction section, for shifting from one mode to another mode among the sleep mode, the warm-up mode, the standby mode, and the running mode.

12. The power-supply control device according to claim 3, wherein the non-power-supply state includes a sleep mode, and the plurality of power-supply states include a warm-up mode, a standby mode, and a running mode, the sleep mode being a mode in which power is supplied only to a control system associated with the plurality of body-detection sections, the warm-up mode being a mode that is provided at a preparatory stage at which preparation for activation of the operation target section from the sleep mode is made, the standby mode being a mode in which power lower than power that is in a steady state is supplied to the operation target section, the running mode being a mode in which power that is in the steady state is supplied to the operation target section, and wherein a cycle-up instruction for shifting from the sleep mode to the warm-up mode, a key input instruction for shifting from the standby mode to the running mode, a job execution instruction for starting an operation in the running mode, and a cycle-down instruction for shifting from the standby mode to the sleep mode are selectively provided for the power-supply-state transition control section as instructions, which are provided by the instruction section, for shifting from one mode to another mode among the sleep mode, the warm-up mode, the standby mode, and the running mode.

13. An image processing apparatus comprising:
the power-supply control device according to claim 1; and
at least one of an image reading section, an image forming section, and a facsimile-communication control section, the image reading section reading an image from a document image, the image forming section forming an image on a recording sheet on the basis of image information, the facsimile-communication control section transmitting an image to a transmission destination in accordance with a communication procedure which is mutually determined in advance,
wherein the image reading section, the image forming section, and the facsimile-communication control section perform each of image processing functions by cooperating with each other, the image processing functions being specified by a user and including an image reading function, an image forming function, an image copy function, a facsimile reception function, and a facsimile transmission function.

14. An image processing apparatus comprising:
the power-supply control device according to claim 3; and
at least one of an image reading section, an image forming section, and a facsimile-communication control section, the image reading section reading an image from a document image, the image forming section forming an image on a recording sheet on the basis of image information, the facsimile-communication control section transmitting an image to a transmission destination in accordance with a communication procedure which is mutually determined in advance,
wherein the image reading section, the image forming section, and the facsimile-communication control section perform each of image processing functions by cooperating with each other, the image processing functions being specified by a user and including an image reading function, an image forming function, an image copy function, a facsimile reception function, and a facsimile transmission function.

15. A power-supply control method comprising: shifting a state of an operation target section from one state to another state among a plurality of power-supply states and a non-power-supply state, the operation target section being a section which operates by receiving supply of power from a mains power source section, each of the plurality of power-supply states being a state having a power consumption which is a corresponding one of power consumptions that are different from one another, the non-power-supply state being a state in which supply of power is not received from the mains power source section or a state in which supply of power that is lower than power determined in advance and that is necessary for control of determining whether or not power is to be supplied is received from the mains power source section;
detecting, using a plurality of body detection sections having detection conditions different from one another, a body in a region which is set in advance, the body including a user who intends to use the operation target section, one of a plurality of body-detection sections detecting a body in a region which is set in advance, which is relatively small, and which is close to the operation target section, and receiving supply of power as the section used for determination control in response to when the body is detected by the body-detection section that continuously receives supply of power in the non-power-supply state; and
providing, on the basis of results of detection of the body capable of movement in the detecting, at least an instruction for shifting between one of the plurality of power-supply states and the non-power-supply state, among instructions for shifting the state of the operation target section from one state to another state in the shifting, wherein when a body is not detected but a job of an operating target section is still executing determining a type of job being performed and placing one or more unused operating target section, based on the type of job being performed, in a non-power-supply state, and when a predetermined amount of time has passed since old jobs have finished executing placing all operating target sections of the multi-functional printer into a non-power-supply state.

16. The power-supply control device according to claim 3, wherein, when one of the plurality of body-detection sections detects the body, the instruction section provides an instruction for shifting from the non-power-supply state to one of the plurality of power-supply states, and, while another one of the plurality of body-detection sections is detecting the body, the instruction section provides an instruction for maintaining the power-supply state.

17. The power-supply control device according to claim 3, wherein one of the plurality of body-detection sections is a pyroelectric sensor, and another one of the plurality of body-detection sections is a reflection-type sensor.

18. The power-supply control device according to claim 3, wherein the non-power-supply state includes a sleep mode, and the plurality of power-supply states include a warm-up mode, a standby mode, and a running mode, the sleep mode being a mode in which power is supplied only to a control system associated with the plurality of body-detection sections, the warm-up mode being a mode that is provided at a preparatory stage at which preparation for activation of the operation target section from the sleep mode is made, the standby mode being a mode in which power lower than power that is in a steady state is supplied to the operation target section, the running mode being a mode in which power that is in the steady state is supplied to the operation target section, and wherein a cycle-up instruction for shifting from the sleep mode to the warm-up mode, a key input instruction for shifting from the standby mode to the running mode, a job execution instruction for starting an operation in the running mode, and a cycle-down instruction for shifting from the standby mode to the sleep mode are selectively provided for the power-supply-state transition control section as instructions, which are provided by the instruction section, for shifting from one mode to another mode among the sleep mode, the warm-up mode, the standby mode, and the running mode.

19. The power-supply control device according to claim 1, wherein the plurality of body-detection sections detect movement of the body.

20. The power-supply control device according to claim 1, wherein one of the plurality of body-detection sections detect movement of the body, and another one of the plurality of body-detection sections detect presence of the body.

* * * * *